US011636457B1

(12) United States Patent
De Bonet et al.

(10) Patent No.: US 11,636,457 B1
(45) Date of Patent: Apr. 25, 2023

(54) EFFICIENT WEIGHT ESTIMATION AND STABILIZATION

(71) Applicant: Amazon Technologies, Inc., Seattle, WA (US)

(72) Inventors: Jeremy S. De Bonet, Southborough, MA (US); Sreemanananth Sadanand, Shrewsbury, MA (US); Xiang Ma, Lexington, MA (US); Oded Maron, Sudbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/804,832

(22) Filed: Feb. 28, 2020

(51) Int. Cl.
*G06Q 20/20* (2012.01)
*G01G 23/01* (2006.01)
*G01G 15/00* (2006.01)
*G01G 23/37* (2006.01)
*G06Q 10/08* (2012.01)
*G06Q 30/06* (2012.01)
*G06Q 10/087* (2023.01)

(52) U.S. Cl.
CPC ......... *G06Q 20/208* (2013.01); *G06Q 20/204* (2013.01); *G01G 15/00* (2013.01); *G01G 23/01* (2013.01); *G01G 23/015* (2013.01); *G01G 23/37* (2013.01); *G06Q 10/087* (2013.01); *G06Q 30/06* (2013.01)

(58) Field of Classification Search
CPC .. G06Q 20/208; G06Q 20/204; G06Q 10/087; G01G 15/00; G01G 23/01; G01G 23/37; G01G 23/015
See application file for complete search history.

(56) References Cited

U.S. PATENT DOCUMENTS

| 9,117,106 | B2 | 8/2015 | Dedeoglu et al. |
| 9,235,928 | B2 | 1/2016 | Medioni et al. |
| 9,473,747 | B2 | 10/2016 | Kobres et al. |
| 10,466,092 | B1* | 11/2019 | Shiee ..................... G01G 15/00 |
| 11,080,676 | B2* | 8/2021 | Afraite-Seugnet .. G06Q 20/204 |
| 2013/0284806 | A1 | 10/2013 | Margalit |
| 2019/0279185 | A1* | 9/2019 | Cheng ................... G06Q 30/06 |

OTHER PUBLICATIONS

Traulsen, Imke, Using Acceleration Data to Automatically Detect the Onset of Farrowing in Sows, Jan. 10, 2018, Pubmed Central, pp. 3-6 (Year: 2018).*

* cited by examiner

*Primary Examiner* — Allen C Chein
*Assistant Examiner* — Aaron N Tutor
(74) *Attorney, Agent, or Firm* — Lee & Hayes, P.C.

(57) ABSTRACT

This disclosure is directed to item-identifying carts that may be utilized by users to automatically identify items that the users place in their carts. In order to identify the items placed into or removed from the cart, the cart may analyze image data, as well as weight data indicating a current weight estimation of a basket of the cart. The cart may include a weight sensor that generates a signal comprising a series of weight measurements of the basket of the cart. The cart may use an algorithm that calculates different mean values of different window sizes of the weight measurements of this signal and, thereafter, may calculate an average of these mean values. This average may be stored as the current weight estimation of the basket.

19 Claims, 13 Drawing Sheets

EFFICIENT WEIGHT ESTIMATION AND STABILIZATION

BACKGROUND

Materials handling facilities, such as warehouses or retail stores, often provide users with carts to facilitate the processes by which the users locate, identify, retrieve, and transport items at the facilities. For example, when a user identifies an item that he or she desires on a shelf or other location within a materials handling facility, the user may remove the item from the shelf or other location and place the item into a receptacle of a cart before the user continues to travel through the facility in search of additional items. The cart may have a durable frame or structure that is configured to travel on wheels such that users are able to fill the carts with numerous, and potentially heavy, items they desire, and use the mobile cart to transport the items around the materials handling facilitate with ease, rather than having to carry the items.

Traditionally, when the user has finished identifying and retrieving the items he or she desires, the user may transport the items in the cart to a check-out destination within the materials handling facility, such as a distribution station, a cashier, or a dedicated self-checkout stand, and transition the items to a human operator or an automated agent. Typically, the user or the human operator manually removes the items from the cart, scans or otherwise registers the items with the user, and places the items into one or more bags or other item carriers. The user may then use the bags or other item carriers to transport the items to another destination (e.g., to an automobile, workstation, or home) by manually carrying the item carriers to the other destination, or by transporting the item carriers to the destination within the cart.

Thus, retrieving items from shelves or other locations within a materials handling facility, and placing the items into bags or other carriers for transportation to their desired destination (e.g., automobile or home), may be a two-step process. First, the items must be retrieved from the shelves or other storage locations and placed into the cart, and second, the items must be removed from the cart, scanned, and placed into a bag or other item carrier. These intervening actions that are required to transition items from a shelf or other storage location into the bags or other item carrier necessarily slows the process by which items are retrieved from a materials handling facility and tend to mitigate the advantages that carts provide.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 further illustrates a process that the cart may implement for providing feedback to a user of the cart that an item placed into the cart has been identified and, thereafter, feedback identifying a determined result of an event involving the identified item.

DETAILED DESCRIPTION

Figure 1:
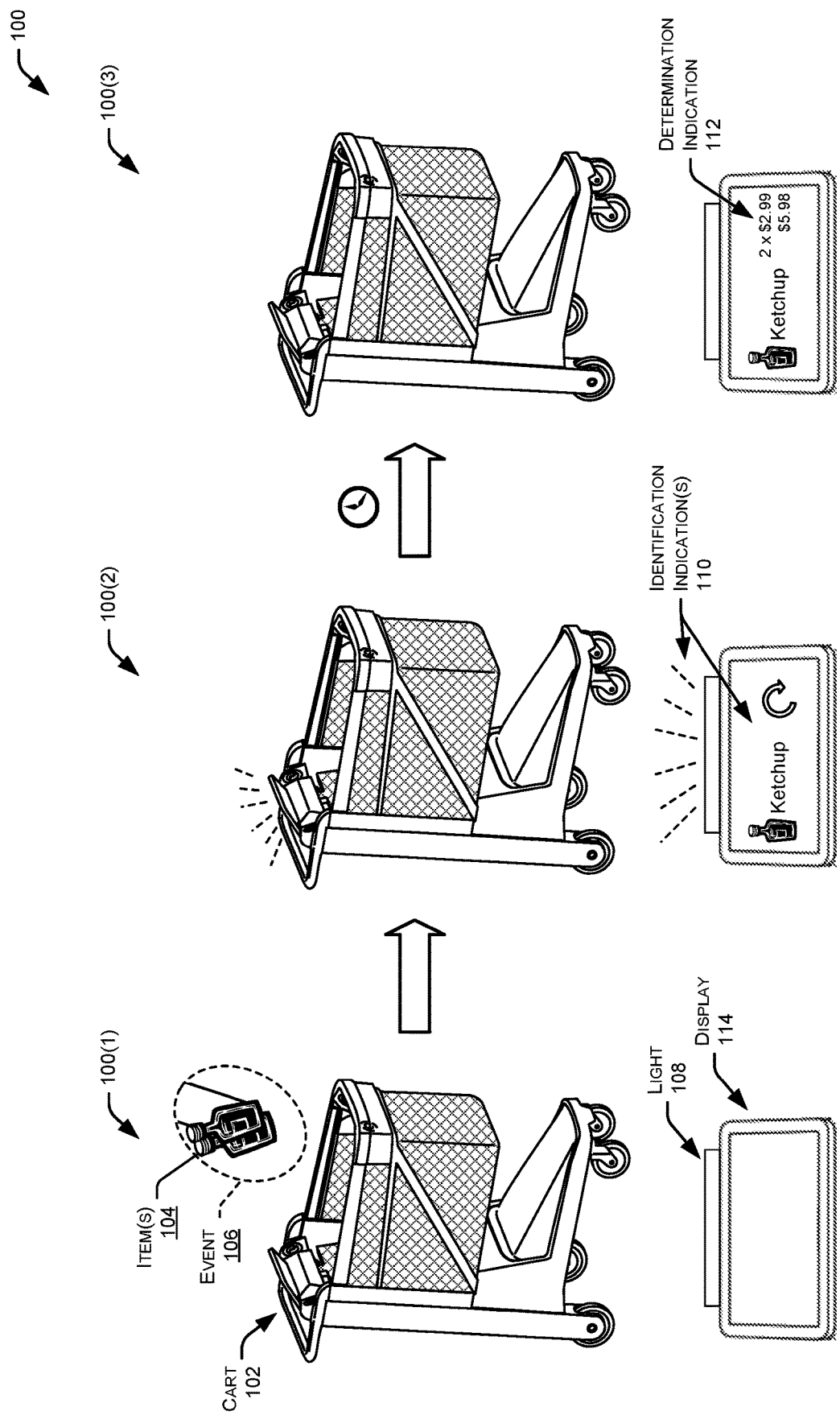
FIG. 1 illustrates an example sequence of operations in which a user places an item into an item-identifying cart, which identifies the item using image data generated by one or more cameras mounted to the cart. In response to identifying the item, the cart outputs one or more indications indicating that an item has been an identified. Sometime thereafter, the cart uses weight data generated by one or more weight sensors of the cart to determine an outcome of an event involving the identified item, such as an action related to the item (e.g., take or return) and a quantity involved.

This disclosure is directed to item-identifying carts that users may utilize in material handling facilities to automatically identify items that the users place in their carts as they move around the material handling facilities. In addition, these carts may automatically determine the outcome of respective events that occur with respect to these identified items. For example, the carts may be configured to identify one or more items that are placed into or removed from the cart, and thereafter determine one or more actions taken with respect to the identified items and a quantity of the items involved. For example, after identifying a first item and a second item either placed into or removed from the cart, the cart may determine that the user added two instances of the first item and removed one instance of the second item. In response to making this determination, the cart may update a virtual cart of a user operating the physical cart to indicate an addition of two instances of the first item and to remove an instance of the second item from the virtual cart.

In some instances, the item-identifying cart (or "smart cart") may include one or more cameras for generating image data, which the cart may thereafter analyze to identify one or more items represented in the image data. After identifying one or more items, the cart may provide feedback to a user operating the cart to indicate that one or more items have been identified. For example, upon a user placing an item into or removing an item from the cart, the cart may generate image data, identify the item, and cause one or more output devices on the cart (or otherwise) to output an indication that the item has been identified. For example, the cart may cause a lighting element on the cart to turn a predefined color (e.g., green) or to illuminate in a predefined lighting sequence. In addition, or in the alternative, the cart may cause a display located on the cart to present data identifying the item, thus indicating to the user that the cart has successfully identified the item that has been placed into or removed from the cart. In still other instances, the cart may cause one or more other displays or output devices (e.g., a mobile phone of the user) to output one or more indications, which may be audible, visual, and/or the like. In still other instances, the cart may cause one or more speakers (on the cart or otherwise) to output an audible tone or other sound indicating that the item has been identified.

Furthermore, sometime after identifying the item(s) and providing feedback to the user that the item(s) have been identified, the cart may attempt to determine the outcome(s) of event(s) involving the identified item(s). For example, after identifying an item placed into or removed from a basket of the cart, the cart may attempt to determine an action taken with respect to the item, such as whether the item placed into the cart (e.g., a "take") or whether the item was removed from the cart (e.g., a "return"). In addition, the cart may attempt to determine a quantity of the items involved, such as whether one, two, or any other number of instances was placed into the cart or removed from the cart. Furthermore, in some instances, the outcome of a particular event may involve multiple identified items and quantities. For instance, after identifying a first item and a second item, the cart may determine that two instances of the first item were added to the cart, while one instance of the second item was removed from the cart. Of course, while an example is provided, it is to be appreciated that the cart may determine any other number of items and any other quantity with respect to these identified items.

After both identifying one or more items and determine outcomes of events involving these items, the cart may provide feedback to the user operating the cart that the outcome has been determined. For example, the cart may cause the display to be updated to present data indicating the determined actions as part of a virtual cart representing a listing of items acquired by the user during a current shopping session. For instance, the display may present data updating the virtual cart of the user to indicate that two instances of the first item have been added to the cart, while one instance of the second item has been removed. Furthermore, the cart may provide other forms of visual and/or audible feedback to the user indicating that the virtual cart has been updated.

In some instances, the smart cart may determine the action(s) taken with respect to the identified item(s) and may determine the quantities involved based at least in part on weight data generated by one or more weight sensors of the cart. For example, the cart may include one or more weight sensors configured to generate weight data indicating a current weight of the basket of the cart. In some instances, before, during, and/or after one or more items have been identified (e.g., using image data generated by the one or more cameras), the cart may analyze the weight data generated by the weight sensors to determine the action(s) taken with respect to the item(s). In some instances, prior to analyzing the weight data to determine the action(s), the cart may wait until the weight reading of the weight sensors has stabilized in order to ensure an accurate weight measurement. That is, given mechanical properties of the cart, the weight signal may be noisy in some instances. For example, the weight signal may be relatively noisy when the cart is being pushed or pulled around, when an item is being added into/removed from the basket, when the cart is being leaned on or rummaged through, or the like. Thus, the smart cart may use an algorithm that attempts to minimize the effect of these perturbations and that indicates whether the weight is stable; this is, when the smart cart can rely on the weight estimation.

In order to determine the current weight of the basket, the smart cart may initially generate one or more signals using one or more weight sensors of the cart, with the signal(s) representing a weight of the basket over time. In some examples, the smart cart includes a single sensor that generate a signal indicative of the weight of the basket over time, while in other instances the smart cart may include multiple weight sensors that each generate a weight signal. In the latter examples, these signals may be combined to generate a single weight signal indicative of the weight of the basket.

In either instance, the signal may comprise a set of contiguous weight measurements measured by the weight sensors over time. For example, the signal may indicate a most recent weight measurement (e.g., "$W_t$"), as well as prior weight measurements (e.g., "$W_{t-1}$", "$W_{t-2}$", "$W_{t-3}$", etc.). In order to determine a weight of the basket, the smart cart may utilize an algorithm that estimates weight of the basket by computing mean weights over several windows of varying size from the current instant in time to some instant of time in the past. The final estimated weight at any instant may comprise the average of the means weights computed over the aforementioned windows.

For example, the algorithm may generate a first mean value comprising a mean of weight measurements of the signal beginning at the current instant time and extending backward some number of weight measurements, such as the last eight (8) weight measurements. The algorithm may also generate a second mean value comprising a mean of weight measurements that include the weight measurements of the first mean value and one or more additional weight measurements back in time. For example, the second mean value may comprise a mean of the last ten (10) weight measurements. That is, the second mean value may comprise a mean value of the eight weight measurements associated with the first mean value and two additional weight measurements (in this example). The algorithm may similarly compute any number, n, of mean values, each comprising an increasing number of weight measurements (relative to the prior mean value) beginning with the most recent weight measurement.

After computing these "n" number of mean values, the algorithm may calculate an average of these mean values and may store this average (i.e., the mean of the mean values) as the current weight estimation of the basket. In addition, the smart cart may utilize an algorithm that compares one or more characteristics of the weight signal to one or more stability criteria to determine whether the weight is stable. For example, the algorithm may determine, from the n number of mean values, a largest mean value and a smallest mean value. Thereafter, the algorithm may determine a difference between the largest and smallest mean value and may compare this to a threshold. If the difference is less than a predefined threshold value, the smart cart may store an indication that the weight is stable. If not, the smart cart may store an indication that that weight is not stable. In some instances, the smart cart outputs an indication of one (1) if the weight is determined to be stable and zero (0) if not. Thus, a weight-measurement (or weight-change) component of the smart cart may continually or periodically determine a weight estimation of the basket (using the algorithm discussed above) along with an indication of one or zero indicating whether the weight is stable. If the smart cart determines that a weight change has occurred that is greater than a threshold value, and if the weight-measurement component outputs an indication that the weight is stable, then the smart cart may use the weight-change data, potentially along with the image data and potentially other data, to determine a result of any event that occurred in in the basket. For example, the smart cart (or a computing device that receives data from the smart cart and/or other devices) may determine the result of an event using weight-change data, image data, and/or any other type of sensor data.

In some instances, the weight-change threshold amount may vary based on one or more factors, such as the current weight of the cart, whether the cart is moving or stationary, or the like. For example, if the cart senses a slight weight change (e.g., because a relatively light item has been placed into or removed from the cart), the threshold value may be relatively small such that the cart will determine that the weight has stabilized if the weight of the basket does not change by this relatively small amount for a predefined amount of time. Conversely, if the cart senses a relatively large change (e.g., because a relatively heavy item has been placed into the cart), the threshold value by relatively large such that the cart will determine that the weight has stabilized if the weight of the basket does not change by this relatively large amount for a predefined amount of time. Similarly, the predefined amount of time may vary based on similar or different factors.

After the weight has stabilized, the cart may determine a change in weight equal to a weight of the basket prior to the identification of the item(s) and the current, stabilized weight. After determining the weight change, the cart may use this weight-change and the identity of the identified item(s) to determine action(s) taken with respect to the item(s) and the quantities involved. For example, the cart may access an item catalog that associates item identifiers with respective weights and may use these "catalog weights" to determine the actions.

For example, envision that the cart has identified two items using the image data generated by the cameras, that the weight-change data indicates that the basket weight has increased by 600 grams, and that the catalog weights of the first and second items are 285 grams and 400 grams, respectively. Based on this information, the cart may determine that the outcome of the event relating to these two identified items is that a user operating the cart placed one instance of the first item and one instance of the second item into the basket of the cart (explaining the 600-gram increase). As such, the cart may update a virtual cart associated with the user and provide feedback to the user, such as on a display of the cart, on a mobile device of the user, or the like.

In another example, envision that the cart identifies two items having catalog weights of 250 grams and 300 grams respectively and that the virtual cart of the user currently indicates that the user has previously taken one instance of the second item. Envision further that the weight-change data indicates that the basket has lightened by 50 grams. Based on this information (i.e., the weights of the identified items, the current contents of the virtual cart, and the weight-change data), the cart may determine that the user has added one instance of the first item to the basket and removed one instance of the second item. Thus, the cart may update he virtual cart to indicate the addition of the first item and the removal of one instance of the second item. In some instances, the cart may update the display to provide this feedback to the user.

In some instances, the smart carts described herein may include one or more cameras for identifying items and one or more cameras to identify the users operating the carts. Upon identifying a user operating a cart and items placed into the cart, the item-identifying cart may update a virtual shopping cart of the user to represent the items that have been placed in, or removed from, the physical cart, using the techniques introduced above and described in detail below. According to the techniques described herein, an item-identifying cart may include one or more first cameras positioned on a frame of the cart and directed substantially toward a position typically occupied by a user pushing the cart to generate first image data for identifying the user. For example, the first image data may represent an identifier associated with an account of the user displayed on a mobile device of the user (e.g., a barcode or the like displayed on a mobile phone), biometric-recognition data representing the user, gesture data representing the user, and/or the like. The cart may include components for associating the first image data with the user, or the cart may send the first image data to one or more remote servers for determining this association.

In addition, the cart may include one or more second cameras positioned on the frame of the cart to generate second image data representing items that a user places in the cart, and/or removes from the cart. The cart may include one or more components that analyze the image data to determine an item identifier for the item(s) placed in the cart, or removed from the cart, and update a virtual shopping cart for the user of the cart. Once a user has finished their shopping session, the user may be able to efficiently checkout of the materials handling facility (or "facility") without having to scan or otherwise register their items with a cashier or at a designated self-checkout stand. In some examples, the user may simply depart the facility with their items and entirely avoid a traditional checkout experience of a facility, such as a grocery store. For instance, the user may have registered for a user account with the facility that is automatically charged for purchases of the items listed in a virtual shopping cart of the user that were identified by the cart during the user's shopping session.

Similar to traditional carts, such as shopping carts commonly found at grocery stores or other retail establishments, the item-identifying carts described herein may include a durable frame, including or supporting a basket, made of plastic or metal (often having four sides in a quadrilateral shape), multiple wheel castors configured to allow the cart to move on a surface, and one or more handles for a user to push and/or pull the cart around in a facility. However, the carts described herein may include additional hardware and software components that configure the carts to, among other functions, identify items placed in the carts on behalf of the users, and update virtual carts of the users to automate one or more steps of a traditional shopping experience.

For example, an item-identifying cart may include one or more cameras (or other imaging sensors), memory that stores software components for identifying users and/or items and for performing other operations for managing virtual shopping carts, at least one processor to execute the software components, one or more weight sensors, and at least one battery to power the components of the cart. The camera(s) may include one or more first cameras positioned on the frame toward a location where a user would typically push the cart. The one or more first cameras may generate first image data, such as image data of a mobile phone of a user representing visual indicia (e.g., a barcode) associated with an account of the user. Thus, the user may hold up his or her mobile device representing the visual indicia such that the first camera(s) may scan or otherwise generate the first image data. The cart may then identify the account of the user using the first image data or may send the image data to a remote server(s), which may identify the user account using the first image data. Thus, items placed into the cart during a shopping session of the user operating the cart may thereafter be associated with the user account.

In some instances, the smart cart may also include one or more displays, which in some instances may reside adjacent the first camera(s) such that the display is viewable by the user operating the cart. The display may present content that is customized for the user at least partly in response to the cart identifying the user via the first image data. For example, upon the cart or the remote server(s) identifying the user operating the cart, the display may present information associated with the user, such as a shopping list of the user, a name of the user, account information associated with the account of the user, and/or the like. Furthermore, in some instances the display may present location-specific information. For example, if the cart determines that it is located in a particular location of a store, such as near a produce section, the display may present information regarding the particular location, such as cost of produce items near the cart. In another example, the display may present information such as promotions occurring on items that reside adjacent the location of the cart. In some instances, the presented promotions may also be determine based on information associated with the user (e.g., a past purchase history, preferences, etc.), current contents of the cart, and/or the like.

In some instances, upon the cart identifying an item using image data generated by the one or more cameras, the display may present item-identifying information (e.g., name, picture, etc.) on the display, thus providing feedback indicating that the item has been identified. However, until the cart can determine the action taken with respect to the identified item and/or the quantity involved, the display may present data indicating that the cart is still processing the event. For example, the display may present, adjacent the item-identifying information, an icon (e.g., a spinning circle, etc.) indicating that the cart is still attempting to determine the outcome of the event involving the item. Upon determining the outcome, such as the item being placed into or removed from the cart, as well as the quantity of the item involved with the take or return, the cart may cause the display to present data indicating the action and the quantity. For example, the cart may update the virtual-cart data presented on the display.

In addition to the cameras positioned towards the user operating the cart for identifying the user, the smart cart may further include one or more second cameras positioned on the frame of the cart such that an optical axis of the second camera(s) is directed towards a location where second image data generated by the second camera(s) represents or captures items that are placed in the cart, and removed from the cart, by a user. The second image data may be analyzed by the software component(s) of the cart, and/or by remote server(s), using one or more image processing techniques, such as text recognition, object recognition, and/or any other technique. The software component(s) may thus identify or determine item identifiers for the items represented in the image data.

As described below, the cart may include a frame that defines a basket to receive the items. The frame may couple to one or more weight sensors (e.g., load cells, etc.) configured to generate weight data indicative of a current weight of the basket. In some instances, upon the cart identifying an item via the image data generated by the cameras directed substantially towards the basket, the cart may determine a weight change that occurs before and after identification of the item. For example, the cart may initially wait until the weight reported by the weight sensors stabilizes and may thereafter determine a change in weight between the current, stabilized weight and a previous weight of the basket prior to the item identification. The cart may then determine, from an item catalog, the weight of the identified item (and the weight of any other items identified in the time period between the last reported weight and the current weight) and may provide this information to an event-determination component. The event-determination component may also receive the weight-change data and information about the current contents of the user's virtual cart and may use this received data to determine an outcome of the event. After doing so, the cart may update a virtual shopping cart for the user's shopping session (e.g., add an item to a list of items to be purchased by the user, or remove an item from the list of items to be purchased). In this way, the cart may identify and track items that are retrieved from different locations within the facility and, after determining the outcomes of events associated with these items, may maintain a virtual shopping cart, or virtual list, of the items selected by the user to provide a more seamless and efficient checkout experience for the user.

In some examples, the cart may have a frame that defines a basket comprising a bottom having quadrilateral shape, one or more (e.g., four) sides protruding from the bottom to define an interior cavity, and a top having a perimeter that defines an opening to receive items placed in the interior cavity of the basket. One or more second cameras may be positioned on the basket of the cart to generate image data representing the items placed in the cart. In some examples, the cameras may be included in respective capture assemblies that include other components, such as light sources (e.g., light emitting diodes (LEDs)) to active and emit light on the items such that the items are illuminated in the image data to help improve processing of the image data to identify the items. In other instances, the cameras may reside adjacent the light sources.

Although the cameras may be positioned anywhere on the cart, in some examples, the basket of the cart may have cameras disposed proximate to each of the four corners of the perimeter of the top of the basket. In this way, the entire cart may be represented in the various field-of-views (FOVs) of the cameras, which also may not be obstructed as the basket of the cart fills up with items. The cameras may, in some examples, be internal to the basket, or otherwise define a relatively small protrusion from the form-factor of the basket, such that the carts may still be capable of "nesting" together in a line when stored at a facility, similar to traditional shopping carts.

Due to the battery life constraints of the cart, it may be advantageous to refrain from having the cameras and/or light sources operating for large periods of time to detect an image being placed in the cart. Thus, in some examples the cart may additionally include one or more proximity sensors (e.g., time-of-flight (ToF) sensors, passive infrared (PIR) sensors, etc.) that generate sensor data to detect movement of an item in, or out, of the cart while the cameras and light sources are de-activated or in a low-power state. In this way, proximity sensors, which may consume less power than the cameras and/or light sources, may detect movement proximate the cart before the cameras and/or light sources are activated.

Thus, the cart described herein may include four cameras disposed at or proximate to the four corners of the perimeter of the basket of the cart. To detect items placed in the cart, or removed from the cart, the cameras may have respective optical axes (e.g., imaginary line along which light propagates through the camera) that are oriented towards an interior of the perimeter of the top of the cart (e.g., towards the middle or centroid of the perimeter of the cart). By orienting the cameras inward with respect to the perimeter of the top of the cart, only items that pass through (e.g., in or out) of the opening of the basket may be represented in image data of the cameras.

The cameras may additionally be oriented to face in a particular vertical direction. For instance, the optical axes of the cameras may, in some examples, be directed downward towards the bottom of the basket to identify when items are placed in the bottom of the basket or taken from the bottom of the basket. For example, some of the carts described herein may include an over-the-basket structural element that couples to a left side and a right side of frame, with a middle portion of this structural element including a camera having an FOV directed substantially downwards into the basket. In addition, this over-the-basket element further include one or more light sources (e.g., LEDs) directed downwards and, in some instances, one or more lighting elements that a user or associate of the facility may selectively turn on to indicate different states of the cart, such as a state in which a user is requesting assistance, a state in which an age of the user is to be verified prior to sale of an item placed into the cart, and/or the like.

However, because users of the carts may not need to remove items from the cart to be scanned before leaving the facility, it may be advantageous for users to place one or more bags, or other item carriers, in the cart before their shopping session. In this way, users may simply retrieve items from shelves or other storage locations during their shopping session, place the items directly into their bags/item carriers, and remove the bags/item carriers from the carts once they have finished their shopping session for a more seamless shopping experience. Accordingly, the basket of the cart may be sized such that one or more bags provided by the facility, and/or by the users themselves, fit efficiently in the bottom of the basket to help maximize storage space of the interior cavity the cart. In such examples, the bags/item carriers may at least partially occlude the FOVs of the cameras such that the items are difficult or impossible to identify using image data from the cameras. Further, in some instances, one or more bag clips may be positioned outside a left and right side of the frame, respectively, for securing one or more bags in the basket. For example, a first strap of a bag may extend over the top of the frame and may attach to a first bag clip on the outside of a left side of the frame, while another strap of the bag may extend outside the basket and attach to a second bag clip outside a right side of the frame. Thus, a user may place items into the bag and, upon completing the shopping session, may remove the straps from the respective bag clips to acquire the items. Again, the bag may reside in the basket in a way that does not occlude the FOVs of the cameras directed substantially towards the interior of the basket.

In some examples the optical axes of the cameras may be directed upward relative to the top of the basket of the cart. For example, the top of the basket of the cart may be disposed in a substantially horizonal plane. The optical axes of the cameras may be directed along the horizontal plane, or upward relative to the horizontal plane, such that the proximity sensors detect the items, and the cameras generate image data representing the items, while the items are at or above the top of the basket (and prior to being placed in a bag or other item carrier). Accordingly, the optical axis of the four example cameras may be directed towards an interior of the perimeter of the top of the basket (e.g., towards a middle or centroid of the perimeter of the basket), and upward relative to a horizontal plane in which the top of the basket is disposed. In this way, the FOVs for each of the cameras may at least partially overlap at a location above, and potentially central to, the perimeter of the top of the cart to define a "sweet spot" or "target zone" where items are detected and/or captures by all four of the cameras.

To utilize a smart cart as described above, a user may have registered for a user account with an operator of the facility to utilize various automated management services provided by an operator of the facility. For instance, the user may have registered for a user account to automate payments made for items taken by the user and included a payment means (e.g., credit card, bank account number, etc.), and may have also provided an identification means such that the facility, or carts, can recognize the user. For instance, the user may have registered to identify themselves to the cart using any identification technique, such as presenting an identification means to the first camera/scanner positioned on the frame of the cart (e.g., presenting a driver's license, presenting a facility-issued card, presenting a user identifier via a mobile phone, etc.), speaking a predefined utterance (e.g., a name of the user, a predefined keyword, etc.), and/or biometric information that may be used recognition. Once a user has identified themselves to a smart cart, the user may begin a shopping session where the smart cart identifies and track items retrieved by the user and placed in the smart cart.

In examples where the smart cart includes proximity sensors, the smart cart may continuously operate the proximity sensors to detect movement of items above the top of the cart. The proximity sensors may generate sensor data that indicates whether an item or object is with a threshold range of distances from the top of the cart (e.g., within 6 inches, within 1 foot, within 2 feet, etc.). The sensor data may be analyzed to detect an item above the perimeter of the top of the cart and trigger the light sources to begin illuminating light and the cameras to begin generating image data. The image data generated by the second camera(s) may be analyzed by the software components to determine whether or not an item is being placed in the cart or removed from the cart. For instance, the image data may represent, over time, movement of the item into the cart, or out of the cart. Additionally, the image data may be analyzed using various techniques to determine an item identifier. Various techniques may be utilized to process image data for identifying the item identifier of the item, such as text recognition, object recognition, and/or other techniques. Upon determining the item identifier, such as determining that the item corresponds to "Strawberry Yogurt," the software components on the cart may store an indication that the item identifier was added to the cart, or removed from the cart, and update a virtual shopping cart accordingly.

After the user has moved throughout the materials handling facility and selected the items they desire to purchase or otherwise take from the facility, the user may end the shopping session in various ways. For instance, the user may return the cart to a cart corral, provide input to the cart indicating an end of the shopping session (e.g., utterance, utilize a user interface element on a touch display, etc.), or simply remove their bags or other item carriers from the cart and leave the facility. After the user has ended their shopping session, the list of item identifiers in the virtual shopping cart may be uploaded to one or more remote servers that manage user accounts for users of the facility. The servers may charge the appropriate user account for the listing of the items in the virtual shopping cart that the user took from the facility.

Although some of the techniques described below are performed locally on the cart, in other examples, some or all of the techniques may be performed by one or more backend devices or servers associated with the facility. For instance, the sensor data and/or image data may be collected at the cart and sent over network(s) to backend devices at the facility, or server devices located remote from the facility, to be processed remotely. However, in some instances it may be advantageous for at least some of the processing to be performed on the cart to reduce latency in identifying items placed in the cart. For instance, it may be advantageous to have low latency when requesting that a user provide feedback to help identify an item recently placed in the cart, rather than the user continuing their shopping session and being asked later about an item. Further, while various techniques described below are with reference to purchasing items in a retail facility, the techniques are generally applicable to any materials handling facility in which a user may place items in a cart. For example, although the techniques described herein are primarily with reference to identifying items placed in a cart by a user for the purpose of identifying a user account to charge for items selected from a materials handling facility, the techniques are equally applicable to any industry in which user recognition may be helpful. For instance, the idem-identifying cart may be implemented for distribution centers where employees collect items from various locations to be shipped through the mail system.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example sequence of operations 100 in which an item-identifying cart 102 identifies one or more items 104 that are placed into or removed from the cart 102, provides feedback to a user operating the cart indicating that the item(s) have been identified, determines an outcome of an event involving the identified item(s) 104, and updates a virtual cart of a user in response.

At a first operation 100(1), a user places one or more items 104 into a basket of the illustrated cart 102. In the illustrated example, the user places two instances of a common item 104 into the basket, although in other examples the user may place into or remove from the basket any other quantity of any other number of items. In some instances, the cart 102 may include one or more cameras directed substantially towards the basket for generating image data of an event 106 involving the item(s) 104. That is, in response to detecting the event 106 (e.g., the user placing into or removing items from the cart 102), the cameras of the cart may generate the image data. Furthermore, while this example describes cameras onboard the cart 102 generating the image data of the event 106, in other instances one or more cameras in an environment of the cart 102 (e.g., one or more overhead cameras) may generate the image data.

Regardless of the location of the cameras, the cart (or another device communicatively coupled to the cart 102) may analyze the image data to identify the item(s) 104 associated with the event 106. For example, the cart 102 may perform image processing on the image data to identify the item(s) 104 via recognition of a barcode on the item(s), by visual characteristics of the item(s), and/or the like.

Furthermore, in response to identifying the item(s), the cart 102 may provide, at an operation 100(2) and to the user operating the cart 102, feedback in the form of one or more identification indications 110 indicating that the cart 102 has identified the item(s) 104. For example, one or more lighting elements 108 coupled to a frame of the cart 102 may illuminate in a predefined color or according to a predefined light sequence to indicate that the item 104 has been identified. In addition, or in the alternative, a display 114 coupled to a frame of the cart 102 may present data indicating that that the item 104 has been identified. In some instances, the lighting element 108 may present a predefined color in response to identifying the item (e.g., green), while the display 114 may present a picture of the identified item and/or text indicating the identified item. In the illustrated example, for instance, the display may present text indicating that the cart 102 has identified "ketchup", along with a picture of the identified ketchup. In addition, the display may present data (e.g., an icon) indicating that the cart 102 is still processing the event 106 to determine an outcome of the event 106. While FIG. 1 illustrates visual feedback, in other instances the feedback may include audible feedback, such as an audible sound or other tone on a speaker of the cart or other device (e.g., a mobile phone of the user operating the cart).

At an operation 100(3), however, and sometime after presenting the identification indication(s) 110, the cart 102 may determine an outcome of the event 106. For example, the cart 102 may determine, based on weight data generated by one or more weight sensors of the cart 102, an amount of weight change in the basket of the cart between the time of identifying the item at the operation 100(2) and a prior time, such as a weight of the basket at a previous time that the virtual cart of the user was updated. In order to determine this weight change, the smart cart may utilize one or more algorithms for estimating a current weight of the basket. For instance, and as introduced above, in order to determine the current weight of the basket, the cart 102 may initially generate one or more signals using one or more weight sensors of the cart, with the signal(s) representing a weight of the basket over time. In some examples, the cart 102 includes a single sensor that generate a signal indicative of the weight of the basket over time, while in other instances the cart 102 may include multiple weight sensors that each generate a weight signal. In the latter examples, these signals may be combined to generate a single weight signal indicative of the weight of the basket.

In either instance, the signal may comprise a set of contiguous weight measurements measured by the weight sensors over time. For example, the signal may indicate that most recent weight measurement (e.g., "$W_t$"), as well as prior weight measurements (e.g., "$W_{t-1}$", "$W_{t-2}$", "$W_{t-3}$", etc.). In order to determine a weight of the basket, the cart 102 may utilize an algorithm that estimates weight of the basket by computing mean weights over several windows of varying size from the current instant in time to some instant of time in the past. The final estimated weight at any instant may comprise the average of the means weights computed over the aforementioned windows.

For example, the algorithm may generate a first mean value comprising a mean of weight measurements of the signal beginning at the current time and extending backward some number of weight measurements, such as the last eight (8) weight measurements. The algorithm may also generate a second mean value comprising a mean of weight measurements that include the weight measurements of the first mean value and one or more additional weight measurements back in time. For example, the second mean value may comprise a mean of the last ten (10) weight measurements. That is, the second mean value may comprise a mean value of the eight weight measurements associated with the first mean value and two additional weight measurements. The algorithm may similarly compute any number, n, of mean values, each comprising an increasing number of weight measurements (relative to the prior mean value) beginning with the most recent weight measurement.

After computing these "n" number of mean values, the algorithm may calculate an average of these mean values and may store this average (i.e., the mean of the mean values) as the current weight estimation of the basket. In addition, the cart 102 may utilize an algorithm that compares one or more characteristics of the weight signal to one or more stability criteria to determine whether the weight is stable. For example, the algorithm may determine, from the n number of mean values, a largest mean value and a smallest mean value. Thereafter, the algorithm may determine a difference between the largest and smallest mean value and may compare this to a threshold. If the difference is less than a predefined threshold value, the cart 102 may store an indication that the weight is stable. If not, the smart cart may store an indication that that weight is not stable. In some instances, the cart 102 outputs an indication of one (1) if the weight is determined to be stable and zero (0) if not. Thus, a weight-measurement (or weight-change) component of the cart 102 may continually or periodically determine a weight estimation of the basket (using the algorithm discussed above) along with an indication of one or zero indicating whether the weight is stable.

If the cart 102 determines that a weight change has occurred that is greater than a threshold value, and if the weight-measurement component outputs an indication that the weight is stable, then the cart 102 may use the weight-change data, potentially along with the image data and/or additional sensor data, to determine a result of any event that occurred in in the basket. For example, in addition to determine the change in weight of the basket (after the current weight estimation stabilizes), the cart 102 may retrieve, from an item catalog, a known weight associated with the identified item(s) 104 and may attempt to determine the outcome of the event 106. For example, the cart 102 may analyze the weight-change data, any known weights associated with the identified item(s), the current contents of the cart 102 (as known to the cart via a virtual cart of the user), and/or the like to determine the most likely outcome of the event 106.

In this example, the cart 102 determines, based on the weight-change data and the weight of the identified ketchup as indicated by the item catalog, that the user has added two instances of the ketchup to the cart 102. Thus, the display 114 presents a determination indication 112 indicating a result of the event 106. As illustrated, the cart 102 has updated the virtual cart of the user to indicate the addition of the two bottles of ketchup and presented an indication 112 of such on the display 114.

Figure 2:
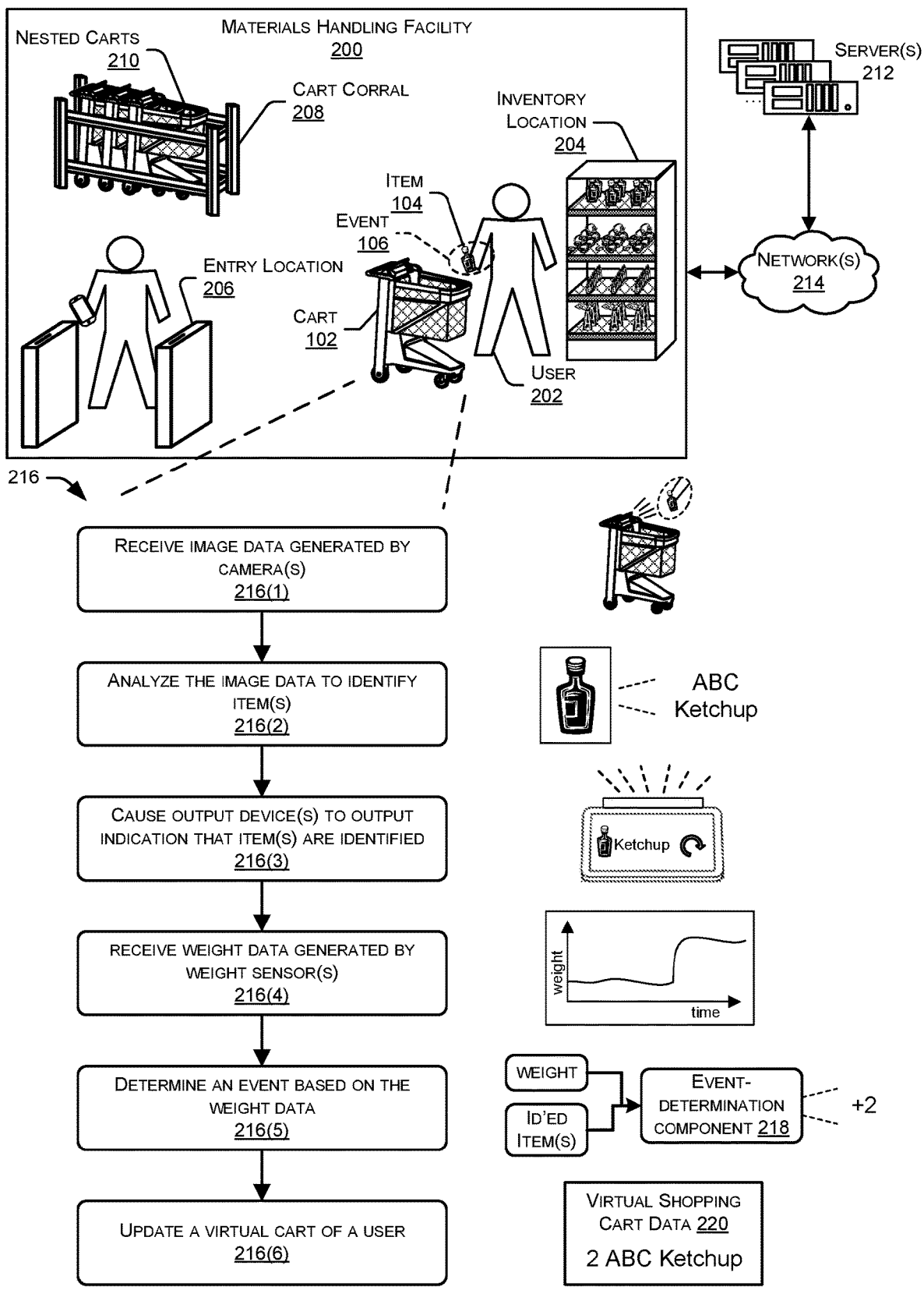
FIG. 2 illustrates an example environment of a materials handling facility that includes the item-identifying cart of FIG. 1 to identify items placed in, and removed from, a basket of the cart by a user.

FIG. 2 illustrates an example environment of a materials handling facility 200 that includes the item-identifying cart 102 of FIG. 1 to identify items placed in, and removed from, a basket of the cart by a user 202. FIG. 2 further illustrates a process 216 that the cart may implement for providing feedback to the user 202 of the cart that an item 104 placed into or removed from the cart has been identified and, thereafter, feedback identifying a determined result of an event involving the identified item.

As FIG. 2 depicts, the user 202 may have engaged in a shopping session in the materials handling facility 200. For instance, the user 202 may have selected an item 104 from an inventory location 204 (e.g., shelf, aisle, etc.) and placed the item 104 in the cart 102 (e.g., shopping cart). The inventory location 204 may house one or more different types of items 104 and the user 202 may pick (i.e., take, retrieve, etc.) one or more of these items 104.

As illustrated, the materials handling facility 200 (or "facility") may have one or more entry locations 206, such as lanes. The entry location 206 may be defined by a gate in some examples and may include a movable barrier to control movement of users 202. For example, the gate may include computer-controlled panels that may be closed to impede passage of the users 202 or opened to permit passage of the user 202. Upon entering a facility 200, a user 202 may desire to utilize a cart 102 for their shopping session to transport items 104 around the facility 200 during their shopping session. In such examples, the user 202 may approach a cart corral 208, or other locations, at which carts 102 are stored. In some examples, the cart corral 208 may comprise a structure, such as an aisle, for storing nested carts 210.

Generally, two or more of the carts 102 may be configured to nest or otherwise functionally join with one another, so that the carts 102 may be easily stored in a cart corral 208, and/or transported in bulk. In some examples, the cart corral 208 may provide additional functionality beyond storage. For instance, the cart corral 208 may facilitate charging of the nested carts 210 that are in the cart corral 208. For instance, the cart corral 208 may have various electrical contacts extending along the length of a horizontal and/or vertical member of the corral 208 that, when placed in electrical contact with an electrical contact of the nested carts 210, charge one or more batteries of the nested carts 210. In other examples, power cords may extend from the cart corral 208 that may be plugged into the nested carts 210 to recharge batteries of the nested carts 210 while not in use.

To utilize a cart 102, a user 202 may approach an unused cart that is not currently engaged in a shopping session (e.g., a nested cart), and interact with the unused cart 102 to identify themselves to the cart 102 and begin a shopping session. For instance, the carts 102 may include a first imaging device (e.g., an image sensor such as a camera, photodetector, or other sensing apparatus designed to read a one or two-dimensional barcode) such that when a user 202 presents a user device, or portion thereof, such as the display, to the imaging device, the cart 102 may identify the user and corresponding user account for a shopping session. Other types of interaction may be performed by a user 202 to identify themselves to a cart 102 (e.g., uttering a name or other keyword to identify the user 202, typing in a password or other user information into a display of the cart 102, and/or any other type of user identification technique).

Once a user has identified themselves to the cart 102, the item-identifying functionality of the cart 102 may be activated such that subsequent items 104 placed in the cart 102 will be identified by the cart 102 and added to a virtual shopping cart for the user 202. As illustrated, a user 202 may move the cart 102 around the facility 200 to one or more inventory locations 204. The user 202 may retrieve items from the inventory location 204 and place the items 104 in the cart 102. Additionally, the user may retrieve items 104 from the cart 102 and put the items 104 back in an inventory location 204, such as when the user 202 changes their mind regarding their desire to purchase or otherwise acquire the item 104. The cart 102 may include various components for identifying item identifiers corresponding to the items 104 placed in the cart and maintaining a virtual shopping cart for the shopping session of the user 202.

Once the user 202 has finished their shopping session, the user 202 may end the shopping session in various ways. For instance, the user 202 may return the cart 102 to the cart corral 208, provide input to the cart 102 indicating an end of the shopping session (e.g., utterance, utilize a user interface element on a touch display, etc.), or simply remove item bags or other item carriers from the cart 102 and leave the facility 200. After the user 202 has ended their shopping session, the list of item identifiers in the virtual shopping cart may be uploaded to one or more remote servers 212, over one or more networks 214, that manage user accounts for users 202 of the facility 200. The server(s) 212 may charge the appropriate user account for the listing of the items in the virtual shopping cart that the user took from the facility 200.

For instance, the server(s) 212 may be configured to determine or generate information indicative of a cost of the items 104 picked by the user 202. Additionally, the server(s) 212 may store payment information (e.g., credit card information, bank account information, etc.) for each user account. In this way, when the user 202 finished their shopping session and the cart 102 sends the listing of item identifiers in the virtual shopping cart over the network(s) 214 to the server(s) 212, the server(s) 212 may be configured to determine a cost or price for all of the listed item identifiers, and charge the user via their payment information for the items 104 selected during their shopping session. In this way, the user 202 need not go through steps of a traditional check-out experience (e.g., waiting in line for a cashier, scanning items with the cashier, paying for items at the cashier, etc.).

The network(s) 214 may include private networks such as an institutional or personal intranet, public networks such as the Internet, or a combination thereof. The network(s) 214 may utilize wired technologies (e.g., wires, fiber optic cable, and so forth), wireless technologies (e.g., radio frequency, infrared, acoustic, optical, and so forth), or other connection technologies. The network(s) 214 is representative of any type of communication network, including one or more of data networks or voice networks. The network(s) 214 may be implemented using wired infrastructure (e.g., copper cable, fiber optic cable, and so forth), a wireless infrastructure (e.g., cellular, microwave, satellite, etc.), or other connection technologies.

The cart 102 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 214 according to the type of protocol or standard being used. As noted above, in some examples, the servers 212 may perform some or all of the operations described below as being performed by the cart 102. While the servers 212 are illustrated as being in a location outside of the facility 200, in other implementations, at least a portion of the servers 122 may be located at the facility 200.

In some instances, the cart 102, the servers 212, and/or a combination thereof may perform the operations of the process 216 during and/or after a shopping session of the user 202. While the following description describes the operation as being performed by the cart 102, it is to be appreciated that these operations may occur at the servers 212 in other implementations.

At an operation 216(1), the cart 102 receives image data generated by one or more cameras, such as one or more cameras mounted to the cart and directed towards a basket of the cart 102. In other instances, the cart 102 may receive the image data from overhead cameras in the facility 200 or the like. Further, in some instances the cart 102 may receive this image data (and/or the cameras may capture the image data) in response to detecting an event, such as an object being placed near the camera(s). For example, the cameras may generate the image data and the cart 102 may receive the image data in response to an item being placed within a predefined proximity of the cameras, such as when a user reaches into a basket of the cart 102 to place an item into the basket or remove an item therefrom. In other instances, meanwhile, the cameras may periodically or continuously generate the image data.

At an operation 216(2), the cart 102 may analyze the generated image data to identify one or more items. In the illustrated example, for instance, the cart 102 analyzes the image data to identify "ABC ketchup" as the item being placed into or removed from the basket of the cart. Of course, while this example shows a single item being identified, it is to be appreciated that the multiple items may be identified in some instances. Furthermore, the cart 102 may identify the item(s) in any number of ways. In one example, the cart 102 analyzes the image data to identify a barcode or other unique visual indicia on the item, while in other instances the cart 102 may generate feature data indicative of visual attributes of the item and may input the feature data into one or more trained models for identifying the item.

Regardless of the method used to identify the item, at an operation 216(3) the cart 102 causes one or more output devices to output an indication that the item(s) have been identified. For example, the cart 102 may cause one or more lighting elements of the cart to illuminate a predefined color, such as green. In addition, or in the alternative, the cart 102 may cause a display on the cart (or any other display, such as a mobile device of a user operating the cart) to present data identifying the item. In some instances, this data may also indicate that the cart is still processing the event to determine a result of the event. For example, and as illustrated, the display may present a spinning icon indicating that the cart 102 is still determining the result of an event involved the identified ketchup.

Furthermore, while this example describes outputting one or more pieces of visual feedback (e.g., in the form of a green light or an update to the display), in some instances the cart may additionally or alternatively output an audible indication that the item has been identified. Furthermore, in instances where the cart 102 is unable to identify an item placed into or removed from the cart 102, the cart 102 may output a different form of feedback indicating the failure to identify the item. For example, the cart 102 may cause the lighting element to illuminate a different color (e.g., orange or red) or according to a different lighting sequence, may cause the display to present an identification-failure indication, may output an audible alert, and/or the like. In some instances, the cart 102 may present data on the display and/or audible data via one or more speakers of the cart 102 instructing the user to again place the item into the cart and/or remove the item from the cart to enable the cart 102 another opportunity to generate new image data and identify the item.

At an operation 216(4), and after identifying the item, the cart 102 may receive weight data generated by one or more weight sensors of the cart 102. As illustrated, the weight sensors may maintain a continuous or periodic weight reading of a basket of the cart 102, which the cart may use to determine the outcomes of events involving the placing items into or removing items from the cart 102. Further, and as introduced above and described below in detail with reference to FIG. 4A, the cart 102 may use a multi-window algorithm for generating a current weight estimation of the basket and a stabilization algorithm for determining whether the weight estimation has stabilized.

At an operation 216(5), after determining that a weight change that is greater than a threshold value has occurred and determining that the weight estimation is stable, the cart 102 determines an event associated with the identified item(s) based at least in part on the determined weight data. For example, the cart 102 may input, to an event-determination component 218, information such as the weight-change data, the identifier of the item, the current contents of the virtual cart of the user, and/or the like. The event-determination component 218 may then determine a most-likely outcome of the event(s) involving the identified items. In this example, for instance, the event-determination component 218 may determine that the most likely outcome based on the inputted data is that the user 202 placed two (2) bottles of the identified ABC ketchup into the basket of the cart. As such, at an operation 216(6), the cart 102 updates virtual-shopping cart data 220 associated with the user to indicate the addition of the two jars of ketchup. Furthermore, in some instances, additional data may be used to determine an outcome of an event. For example, the image data may be analyzed to determine a motion vector indicating a direction of the item(s) as they are placed into or removed from the basket, which may be used to determine an action taken with respect to the item(s). Further, the image data may be analyzed to determine a quantity of each item placed into or removed from the basket. In still other instances, sensor data from one or more other sensors may be used to determine event outcomes.

It is further noted that, in some instances, the event-determination component 218 may refrain from attempting to determine the outcome of an event until a weight of the basket, as reported by one or more weight sensors of the cart has stabilized and/or until activity within the basket has ceased. For example, the event-determination component may wait until a weight-change component outputs an indication that the current weight estimation is stable. In addition, or in the alternative, the event-determination component may wait to determine the outcome of an event until the event-determination component 218 receives an indication that activity has ceased within the basket of the cart. For example, an activity-detection component may analyze the image data generated by the one or more cameras and may output an indication when activity has ceased. By awaiting this indication, the event-determination component 218 does not attempt to determine an outcome of an event until the event is likely to have been completed. To provide an example, envision that a user places an item into the basket (resulting in a weight change), before immediately removing the item. By waiting until the image data indicates that no activity is occurring in the basket (that is, until the user has removed his or her hand from the basket), the event-determination component 218 does not first compute an event of an item being placed into a cart followed by an event of the same item being removed from the cart. Instead, by waiting until all activity in the basket has ceased, the event-determination component 218 does not compute an event, given that the item initially placed into the basket was removed.

In one example, the event-determination component 218 may determine the outcome of events by generating respective scores for different possible outcomes of a given series of events. To provide an example, the event-determination component 218 may receive an indication of one or more items identified since the last update to the virtual shopping cart data 220 and the change in weight of the basket of the cart since the last update. In addition, the event-determination component 218 may receive, or may determine, a weight associated with each of the identified items. For example, the event-determination component 218, or another component, may access catalog data using an identifier of each of the identified items to determine a catalog weight associated with each respective item. With this information, the event-determination component 218 may generate one or more hypotheses of how to explain the change in weight of the basket given the identified items (and their catalog weights). In some instances, each hypothesis may indicate an action take with respect to an identified item (e.g., take or return) and a count of each respective item (e.g., zero, one, two, etc.).

In some instances, the event-determination component 218 may determine that a determined hypothesis is associated with a confidence score that is greater than a threshold score and, thus, the virtual shopping cart data 220 may be updated according to this hypothesis. In other instances, the event-determination component 218 might not determine a hypothesis that is greater than the threshold score and, thus, an alarm (e.g., visual, audible, etc.) or other feedback may be output to the user. For example, a lighting element of the cart may be illuminated orange, red, or the like, a display on the cart may indicate that no outcome was determined, or the like. In still other instances, the event-determination component 218 may determine multiple hypotheses that are associated with respective confidence scores that are each greater than the threshold value. In these instances, the cart may output a request to the user for assistance. For example, the cart may output on a display or other output device a request to indicate which of the determined hypotheses corresponds to the actual event performed by the user. Upon receiving input from the user, the cart may update the virtual shopping cart data 220 accordingly.

In some instances, the event-determination component 218 generates the hypotheses and assigns them respective scores using a breadth-first search (BFS) or any other known algorithm. In other examples, the event-determination component may generate a combination of each possible count, bounded by a particular integer of counts (e.g., each possible combination of counts between +n (a number of n instances of the item added to the cart) and −n (a number of n instances of the item removed from the cart)). Further, given that noise may exist in the measurement of the weight of the basket, the event-determination component 218 may be configured to compute a score associated with each respective hypothesis using a probabilistic approach, such:

Score(counts,delta)=Pr(counts|delta)=Pr(delta-|counts)* Pr(counts)/Pr(delta)

In this example, the event-determination component 218 may be configured to assume that Pr(delta) is uniform and, thus, does not change the relative probabilities of one hypothesis over another. Further, given the above, the event-determination component may be configured to compute Pr (delta|counts) (e.g., the probability that the weight of the basket has changed (delta) given the outcome implied by the counts) and Pr(counts) (e.g., the probability that the user performed the outcome implied by the counts).

In some instances, this latter probability (Pr(counts)) may be item-specified, user-specific, facility-specific, and/or the like. For instance, some items may be consistently purchased according to a certain count, such as singularly, in pairs, or the like. For example, historical shopping data may indicate that a first item, such as laundry detergent, is typically purchased one at a time and, thus, the likelihood of a count of +1 (addition of one instance of laundry detergent) may be greater than a likelihood of a count of +2 (addition of two instances). In another example, historical shopping data may indicate that a second item, such as a can of tuna, is typically purchased in multiple quantities. Thus, the likelihood of a count of +1 (addition of one instance of an identified can of tuna) may be less than a likelihood of a count of +2 (addition of two instances).

In addition, or in the alternative, this probability may be user-specific and/or facility-specific. For example, the event-determination component 218 may determine a probability of particular counts based on prior behavior of a particular user operating the cart. For example, if a user associated with a particular cart consistently places three instances of bread into her cart, then this particular count may be associated with a relatively high probability or likelihood. Further, if users at a particular facility often place two instances of chips into their carts, this probability may be relatively high. Further, in some instances a probability of a particular count of an item may be based on additional factors, such as current contents of the cart of the user, time of day, day of week, or the like. For example, if a user is determined to have added two packs of hot dogs to her cart, and hot-dog buns are later identified, the probability associated with the addition of two packages of hot-dog buns may be greater than the probability associated with the addition of one package.

To provide one example of Pr (counts), the event-determination could determine a probability that a user added or removed a number of counts of an identified item between zero (0) and three (3). For example, the event-determination component 218 may be configured to determine with probabilities that a user removed three instances of the same item, added three instances of the same item, and each possibility therebetween. As described above, these probabilities may be generic (e.g., the same for each user, item, facility, etc.) or may be user-specific, item-specific, facility-specific, and/or the like. Further, while the following example describes probabilities for adding or removing three instances of a particular item, any other number of instances may be computed in other examples. In one example, the event-determination component 218 may be configured according to the following probabilities:

Pr(counts[item]=+1=60%

Pr(counts[item]=−1=25%

Pr(counts[item]=0=10%

Pr(counts[item]=+2=3%

Pr(counts[item]=−2=1%

Pr(counts[item]=+3=0.8%

Pr(counts[item]=−3=0.2%

In the above example, the event-determination component 218 is configured with a 60% probability that a user added a single instance of an item to her cart, a 25% probability that the user removed a single instance of the item from her cart, a 10% chance that the user made no change with regards to the item (e.g., placed the item into the cart before removing it), a 3% probability that the user added two instances of the item to her cart, a 1% probability that the user removed two instances of the item from her cart, a 0.8% probability that the user added three instances of the item to her cart, and a 0.2% probability that the user removed three instances of the item from her cart.

With regards to Pr(delta|counts), if each measurement did not include an error, then the event-determination component 218 may compute a difference between the implied weight change and the actual weight change according to the following:

Implied weight=sum(counts[item]*catalog weight [item])

error=absolute value(implied weight−delta)

Here, the Pr(delta counts) would be 1 if the error is 0 and 0 if the error >0. However, given that the measurements may include error, some tolerance may be introduced such that Pr(delta|counts)=1 if error <tolerance, 0 otherwise.

An example of the above techniques is provided below. It is to be appreciated, however, that this example is one of many and that other algorithms, weights, probabilities, and/or the like may be used by the event-determination component 218 to determine event outcomes. For sake of brevity and understanding, in the following example, the event-determination component 218 receives an indication that two items have been identified since a last update of virtual shopping cart data of a user (a can of soda and a bag of chips), and the event-determination component 218 determines hypotheses for combinations between the addition of two instances of each item and the remove of two instances of each item. Stated otherwise, while this example describes analyzing the possibilities that the user added or removed two or less of each of the two identified items, in other instances the event-determination component 218 may compute more or fewer hypotheses.

In this example, envision that the event-determination component 218 receives an indication that a can of soda has been identified along with a bag of chips, and that the former item is associated with a catalog weight of 300 g and the latter item is associated with a catalog weight of 100 g. In this example, the event-determination component 218 generates a hypothesis from +2 (two instances added to a cart) to −2 (two instances removed from the cart) for each item. Furthermore, envision that the weight sensors determine that the weight of the basket of the cart has increased by 110 grams between a current time and a time associated with a last update the virtual shopping cart data 220 and that a tolerance of 20 g is applied. Assume further that the virtual shopping cart data 220 indicates that the cart already include one instance of the can of soda and one instance of the bag of chips. Further, the Pr(counts) may be similar to that discussed above, although for a range of +2 to −2 counts.

In this example, the event-determination component 218 may calculate twenty-five (25) hypotheses regarding the two identified items, as bounded between +2 and −2, as follows, where the first value corresponds to the can of soda and the second value to the bag of chips. Further, it is to be appreciated that the event-determination component 218 may zero out probabilities that do not make sense given the current state of the virtual shopping cart data.

$$-2,-2 \Rightarrow 0.000 \quad [1]$$

$$-2,-1 \Rightarrow 0.000 \quad v$$

$$-2,0 \Rightarrow 0.000 \quad [3]$$

$$-2,1 \Rightarrow 0.000 \quad [4]$$

$$-2,2 \Rightarrow 0.000 \quad [5]$$

$$-1,-2 \Rightarrow 0.000 \quad [6]$$

$$-1,-1 \Rightarrow 0.000 \quad [7]$$

$$-1,0 \Rightarrow 0.000 \quad [8]$$

$$-1,1 \Rightarrow 0.000 \quad [9]$$

$$-1,2 \Rightarrow 0.000 \quad [10]$$

$$0,-2 \Rightarrow 0.000 \quad [11]$$

$$0,-1 \Rightarrow 0.000 \quad [12]$$

$$0,0 \Rightarrow 0.000 \quad [13]$$

$$0,1 \Rightarrow 0.060** \quad [14]$$

$$0,2 \Rightarrow 0.000 \quad [15]$$

$$1,-2 \Rightarrow 0.006** \quad [16]$$

$$1,-1 \Rightarrow 0.000 \quad [17]$$

$$1,0 \Rightarrow 0.000 \quad [18]$$

$$1,1 \Rightarrow 0.000 \quad [19]$$

$$1,2 \Rightarrow 0.000 \quad [20]$$

$$2,-2 \Rightarrow 0.000 \quad [21]$$

$$2,-1 \Rightarrow 0.000 \quad [22]$$

$$2,0 \Rightarrow 0.000 \quad [23]$$

$$2,1 \Rightarrow 0.000 \quad [24]$$

$$2,2 \Rightarrow 0.000 \quad [25]$$

As shown above, the event-determination component 218 has computed two non-zero scores: a first score of 0.06 for the outcome where the user did not add or remove any instances of the can of the soda from the cart but placed one instance of the bag of chips into the cart and a second score of 0.006 for the outcome where the user added one instance of the can of soda into the cart and removed two instances of the bag of chips. However, given that the first outcome has a score that is ten times greater than the latter, the event-determination component 218 may output an indication that this was the result of the event, causing the virtual shopping cart data 220 to be updated to indicate an addition of one bag of chips.

Figure 3A:
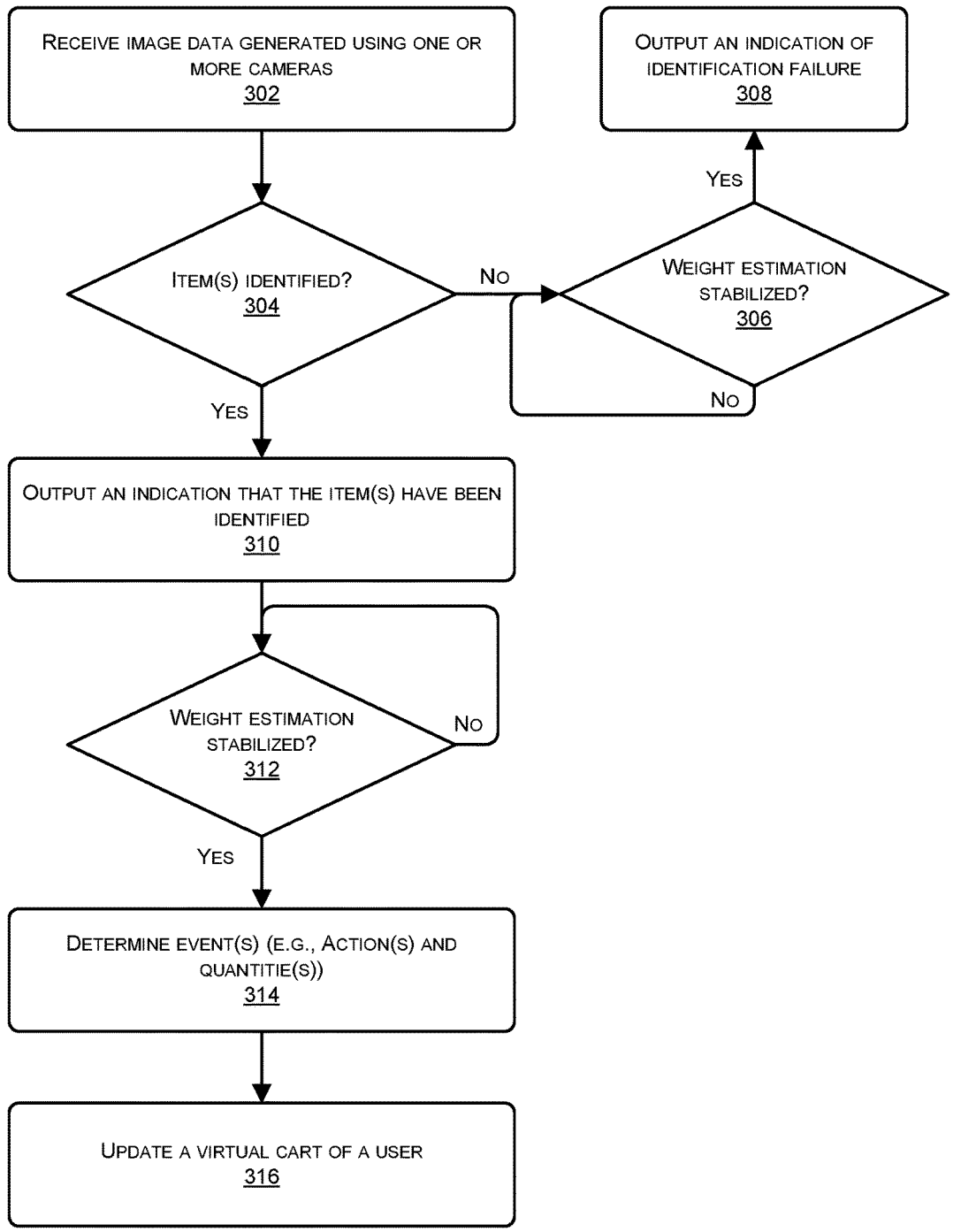
FIG. 3A illustrates a flow diagram of an example process for identifying one or more items, providing an indication that the item(s) have been identified, determining a change in weight of a basket holding the item(s), and determining a result of one or more events involving the identified item(s).

For example, envision that the event-determination component 218 receives an indication that two items have been identified (item A and item B). The event-determination component may list each possible combination of outcomes bounded by the addition or removal of two instances of each item. That is, the event-determination component 218 may determine a likelihood that the outcome of the event was one of the following: removal FIG. 3A illustrates a flow diagram of an example process 300(1) for identifying one or more items, providing an indication that the item(s) have been identified, determining a change in weight of a basket holding the item(s), and determining a result of one or more events involving the identified item(s). The process 300(1), as well as each process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. Finally, while the processes are described as being performed by an item-identifying cart 102, one or more of the operations of these processes may be performed by the remote servers 212, other components, or combinations thereof.

At an operation 302, the event-determination component 218 may receive image data generated by one or more cameras. In some instances, the image data represents one or more items being placed into or removed from a basket of a cart. As described above, these cameras may couple to a frame of the cart, may comprise overhead cameras coupled to a ceiling in an environment of the cart, of the like.

At an operation 304, the image data is analyzed to identify one or more items represented in the image data. As described above, the cart 102 may perform one or more image-recognition techniques to identify the items, including identifying barcodes or other unique visual indicia from the image data. If the cart 102 is unable to identify an item from the image data at 304, then at an operation 306 the cart 102 may analyze weight data generated by one or more weight sensors on the cart 102 to determinate whether a current weight estimation of the basket has stabilized. In some instances, this comprises comparing a difference between a largest mean value of the window calculations and a smallest mean value to a threshold, as described above. In other instances, determining whether the weight has stabilized may comprise determining whether the weight change is less than a threshold amount for a predefined amount of time. In some instance, jitter introduced to the weight reading from a user moving the cart 102 may cause the current weight reading to fail the test of operation 306. As such, the weight change may stabilize, in some instances, upon the user ceasing movement of the cart 102, but not before.

After the weight has stabilized, meanwhile, and after the cart 102 has determined that an item has not been identified, then an at an operation 308 the cart 102 may output an indication of an identification failure. For example, the cart 102 may cause a lighting element of the cart to illuminate in a predefined color (e.g., orange or red) or according to a predefined lighting sequence, may output an audible alert, and/or may present data on a display of the cart indicating the failure. In one example, the cart 102 may present, on the display, an indication that the cart 102 has failed to identify the item and instructions instructing the user to again place the item in the purview of the camera(s). The process 300(1) may then return to the operation 302. The cart 102 may additionally, or alternatively, output a request (audibly and/or visually) that the user re-scan the item, output a query regarding whether the user placed a personal item in the cart, and/or the like.

If, however, the cart 102 identifies the item at the operation 304, then at an operation 310 the cart 102 may output an indication that the item(s) have been identified. For example, the cart 102 may cause the lighting element to illuminate according to a predefined color (e.g., green), may output an audible sound, and/or may cause the display to output an indication. For example, the cart 102 may cause the display to present data identifying the item, such as a picture of the item from an item catalog, a textual representation of the item, or the like.

At an operation 312, the cart 102 may analyze weight data generated by one or more weight sensors on the cart 102 to determinate whether a current weight estimation of the basket has stabilized. In some instances, this comprises comparing a difference between a largest mean value of the window calculations and a smallest mean value to a threshold, as described above. In other instances, determining whether the weight has stabilized may comprise determining whether the weight change is less than a threshold amount for a predefined amount of time. Stated otherwise, the cart 102 may determine whether the current weight has stabilized to a degree such that the cart 102 may use the weight to attempt to determine the outcome of the event involving the identified item(s) with accuracy. In some instance, jitter introduced to the weight reading from a user moving the cart 102 may cause the current weight reading to fail the test of operation 312. As such, the weight change may stabilize, in some instances, upon the user ceasing movement of the cart 102, but not before.

Upon the weight stabilizing and, thus, meeting the criteria of the operation 312, the cart 102 may attempt to determine the outcome of the event(s) involving the identified item(s). For example, the event-determination component 218 may receive the weight data indicative of a change in weight corresponding to a difference between the current, stabilized weight of the basket and a previous weight of the basket prior to the identification of the item at the operation 304. In some instance, the weight change may be calculated based on a difference between the current weight and a weight of the basket at a time of a previous update to the virtual cart of the user.

Furthermore, in some instances the event-determination component 218 determines the outcome of the event(s) according to the techniques described above. For example, the event-determination component may generate respective probabilities that certain outcomes occurred. If, for example, a particular item was identified, the event-determination component 218 may determine a catalog weight associated with this identified item and may use this catalog weight, the change in weight of the basket, and potentially other information (e.g., current contents of the cart, probabilities associated with different actions, etc.) to determine respective probabilities of different outcomes. For example, the event-determination component may determine a first probability that the user added an instance of the identified item to the cart, a second probability that the user removed an instance of the identified item from the cart, and the like. Further, the event-determination component 218 may determine a first probability that a first quantity of the item (e.g., one instance of the item) was added to the cart, a second probability that a second quantity of the item (e.g., two instances of the item) was added to the cart, a third probability that the first quantity of the item was added to the cart, a fourth probability that the second quantity of the item was removed from the cart, and so forth. The determination of the event(s) at the operation 314 may be based at least in part on these probabilities. For example, an outcome associated with a highest score or probability may be determined to have occurred.

Finally, at an operation 316 the cart 102 may update a virtual cart of the user 202. This may include updating the display of the cart to indicate the addition or removal of the items according to the outcome of the event determined at the operation 314.

Figure 3B:
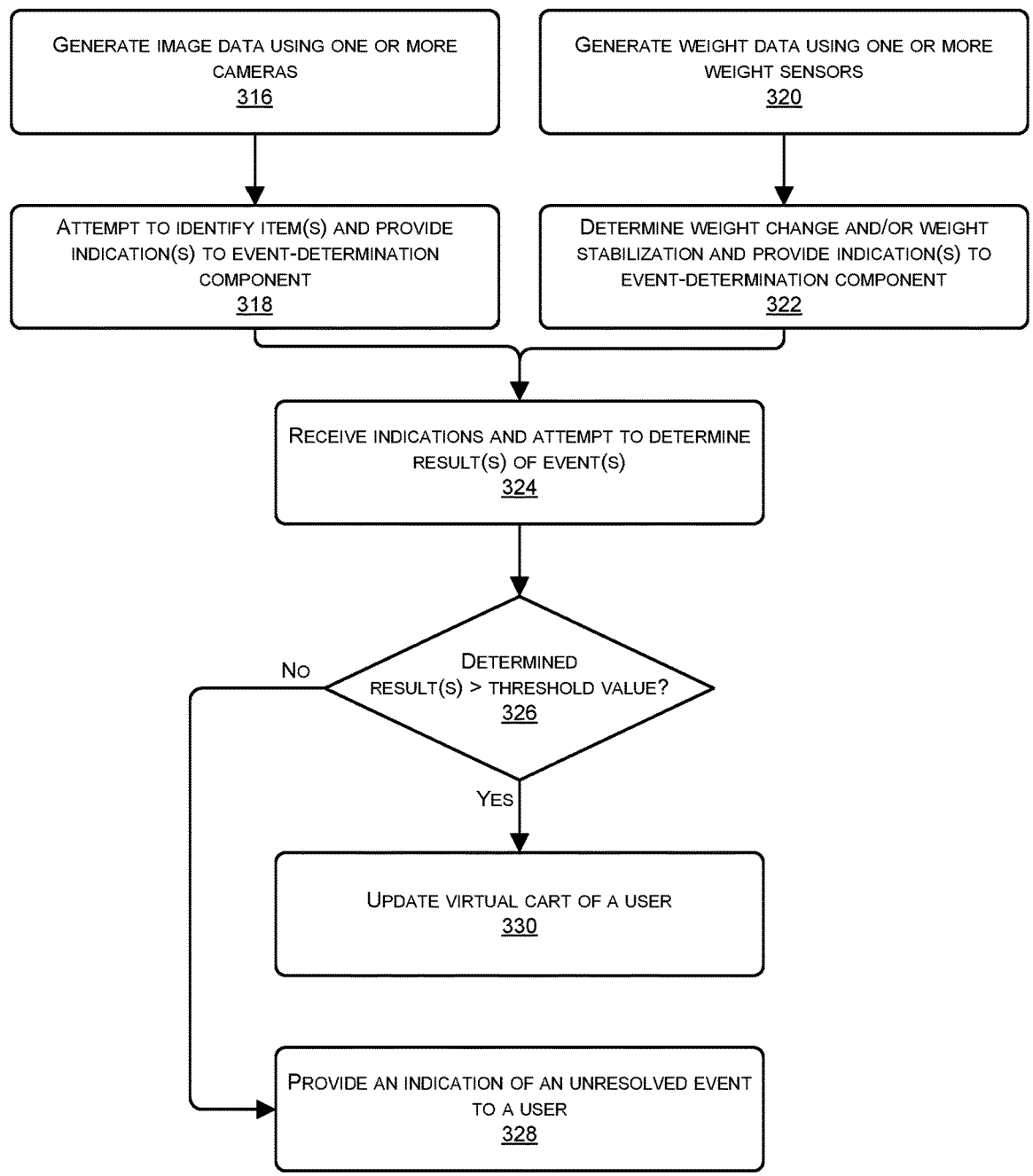
FIG. 3B illustrates a flow diagram of another example process for determining a result of an event using image data and weight data of a basket of a mobile cart.

FIG. 3B illustrates a flow diagram of another example process 300(2) for determining a result of an event using image data and weight data of a basket of a mobile cart. At an operation 316, one or more cameras of a mobile cart may generate image data, which may represent one or more items being placed into or removed from the cart. At an operation 318, an item-identification component (such as component 638 discussed below with reference to FIG. 6A) may analyze the image data to attempt to identify one or more items.

As described above and below, the item-identification component may identify a respective barcode of an item to identify the item, may generate feature data from the image data and input the feature data into one or more trained classifiers for identifying the item, and/or the like.

Figure 4A:
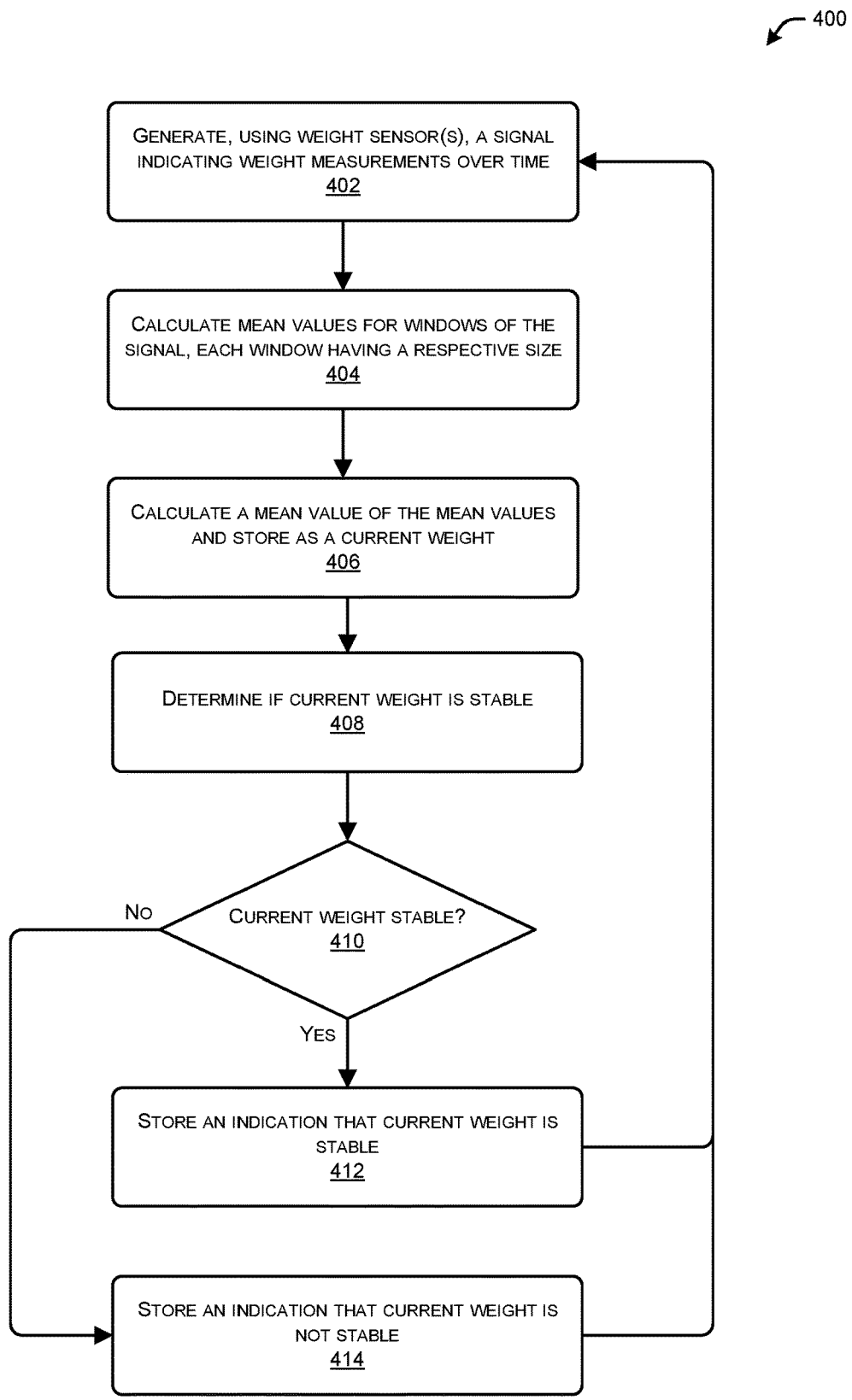
FIG. 4A illustrates a flow diagram of an example process for efficiently determining an estimation of a current weight of the basket and determining whether the current weight is stable and, thus, may be used for determining a result of any events involving items being placed into or removed from the basket.

In addition, at an operation 320, one or more weight sensors of the cart may generate weight data indicating a weight of a basket of the cart. At an operation 322, a change in weight of the basket may be determined. In some instances, the cart may determine the weight change data by first using the weight data generated at the operation 320 to determine a current weight of the basket of the cart using the techniques described below with reference to the process 400 of FIG. 4A. The cart may then compare the current weight, determined using the techniques described below with reference to the process 400, to a prior weight, which may have been determined using similar techniques. In addition, the cart may determine whether the current weight meets one or more stability criteria. This information (e.g., weight-change data, stability data, etc.) may be provided to the event-determination component 218. FIG. 4A, discussed below, illustrates and describes an example manner in which the cart may generate the weight estimation, as well as determine and indicate whether this weight estimation has stabilized (such that the cart may attempt to determine results on any events involving the cart).

At an operation 324, the event-determination component 218 receives indication(s) of any identified item(s) from the image data and an indication of a weight change in the basket of the cart and attempts to determine the results of one or more events based at least in part on this data. For example, and as discussed above, the event-determination component 218 may determine a catalog weight associated with each of the identified items and may generate one or more hypotheses that each may explain the change in weight of the basket. As described above, this may include generating respective probabilities that different quantities of the identified items have been added to and/or removed from the basket of the cart.

At an operation 326, the event-determination component 218 determines whether any of the determined results are greater than a threshold value. If not, then at an operation 328 the event-determination component 218 or another component may output an indication of an unresolved event. That is, if the event-determination component 218 is unable to determine with a threshold amount of confidence the reason for the weight change of the basket, then the cart may output such an indication to the user via an orange light, an indication a display, an audible alert, or the like. If, however, the most likely hypothesis is associated with a confidence score that is greater than a threshold value, then at an operation 330 a virtual cart associated with the user operating the cart may be updated. For example, if the event-determination component determines that one instance of item A has been added to the cart, two instances of item B have been removed from the cart, and three instances of item C have been added to the cart, then the process 300(2) may update the virtual shopping cart data 220 associated with the user operating the cart to indication one addition of item A, three additions of item C, and two removals of item B.

FIG. 4A illustrates a flow diagram of an example process 400 for efficiently determining an estimation of a current weight of the basket and determining whether the current weight is stable and, thus, may be used for determining a result of any events involving items being placed into or removed from the basket. At an operation 402, one or more weight sensors of the cart may generate one or more signals indicating weight measurements of the cart over time.

Figure 4B:
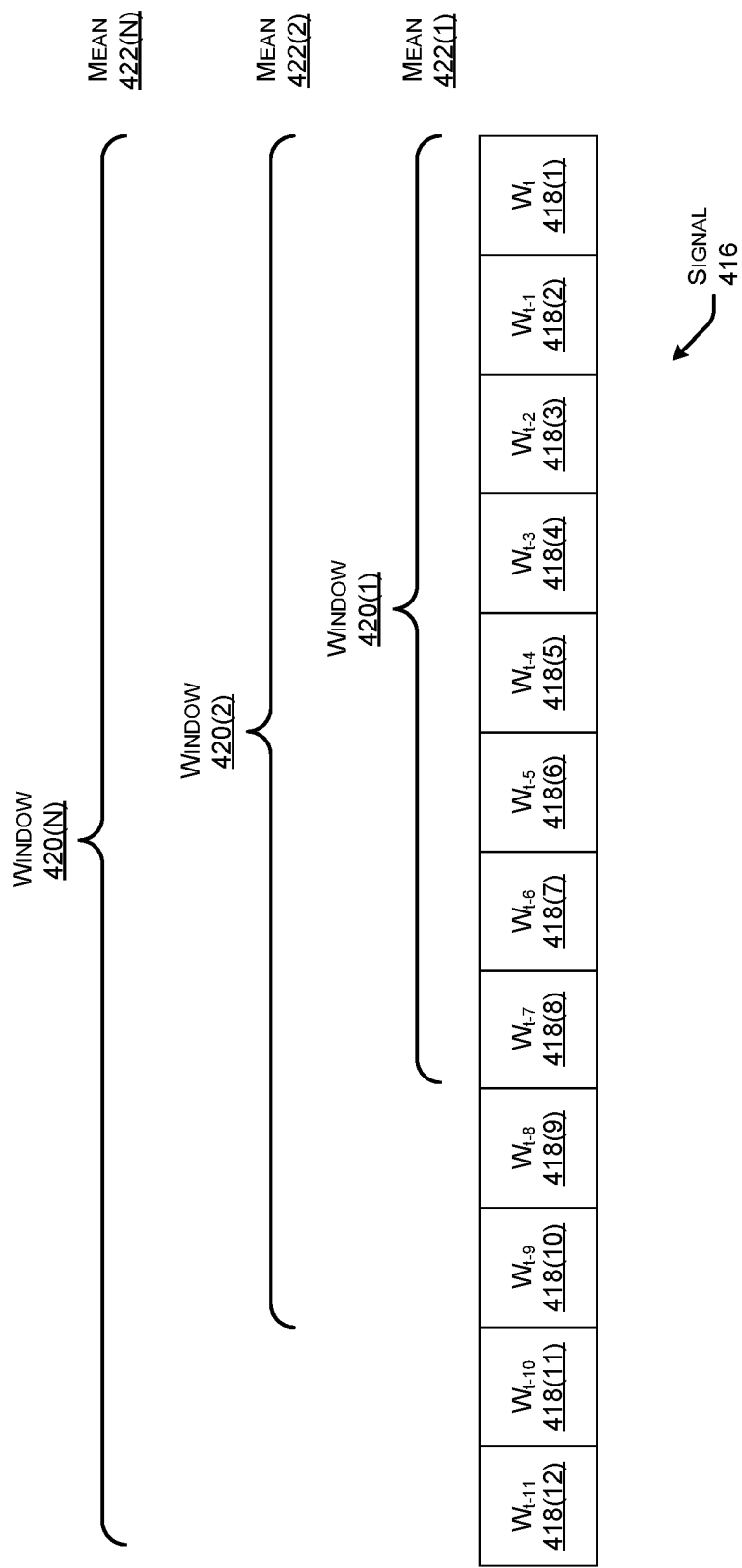
FIG. 4B illustrates an example signal generated by one or more weight sensors for estimating a current weight of the basket. The signal may comprise a series of weight measurements over time, while an algorithm for estimating the weight may involve determining mean values of different windows sizes of the weight measurements and determining a mean of the summation of the mean values.

FIG. 4B illustrates an example of a signal 416 that the weight sensor(s) may generate. As illustrated, the signal 416 may include contiguous weight measurements 418(1), 418(2), . . . , 418(12), each of which may correspond to a weight measurement generated by the weight sensor at a particular time. For example, the weight measurement 418(1) may corresponding a most recent weight measurement, the weight measurement 418(2) may comprise a next-most recent weight measurement, and so forth. For purposes of the illustration, the weight measurement 418(12) may comprise the least recent weight measurement, but in other instances the signal 416 may include additional weight measurements.

Furthermore, the signal 416 may comprise a signal generated by a single weight sensor or may comprise a summation of multiple signals generated by multiple weight sensors. In the latter instances, each weight measurement 418 of the signal 416 may comprise a summation of a corresponding weight measurement from each of the multiple signals. For example, the weight measurement 418(1) may comprise the summation of measurements for a most recent measurement from each signal, and so forth. Furthermore, it is noted that each weight sensor may be calibrated to generate a calibration coefficient, which may be used prior to summing the signals from the weight sensors. In order to calibrate each weight sensor, an object of a known weight (e.g., 500 grams) may be placed onto the weight sensor and the output of the weight sensor may associated with a reading from the sensor, resulting in the calibration coefficient. Thus, each weight measurement of the signal 416 may correspond to the following equation:

$$W(t)=LC(1)*C(1)+LC(2)*C(2) \ldots +LC(N)*C(N)$$

Where LC is a particular weight sensor (or "load cell") and C is a corresponding coefficient Returning to FIG. 4A, an operation 404 represents calculating respective mean values for different windows of the signal, with each respective window have a different size. FIG. 4B, for example, illustrates that this operation may include calculating, for a first window 420(1), a first mean value 422(1). In this example, the first window 420(1) comprises the most recent eight (8) weight measurements of the signal, while the first mean value 422(1) comprises a mean of these eight measurements. This operation 404 may further include calculating, for a second window 420(2) that includes the most-recent ten (10) weight measurements, a mean value 422(2) of these weight measurements. Further, this operation 404 includes computing each mean value up to a $N^{th}$ mean value 422(N) for an $N^{th}$ window size 420(N).

In some instances, the operation 404 represents calculating a mean value for each window according to the following equation:

$$mean_n = \frac{\sum_{t-c}^{t-c-n} w_t}{n}$$

$n$ = windiw index $t$ = current time $c$ = smallest window size

As will be appreciated, as the signal updates over time (e.g., to reflect a newest weight measurement), these "n"

number of mean values may be re-calculated. For example, the process 400 may compute each of the "n" number of mean values each time the signal 416 updates with a new, most-recent weight measurement. Thus, in order to speed up the repeated computation of these mean values over differently sized windows, the mean values may be calculated using 1D cumulative sum arrays. For instance, and continuing the example from FIG. 4B, a cumulative sum may be maintained for the twelve (12) weight measurements associated with the largest window 420(N), beginning with the least-recent weight measurement. For example, envision that the signal 416 indicates that the value of the weight measurements 418(1)-(12) have the following values (without units for simplicity):

418(12)=10

418(11)=10

418(10)=9

418(9)=11

418(8)=12

418(7)=11

418(5)=12

418(4)=10

418(3)=10

418(2)=9

418(1)=11

Thus, a cumulative sum array may be maintained, beginning with the least-recent weight measurement (418(12)) to the most-recent weight measurement. In this example, the cumulative sum array may thus be as follows: 10; 20; 29; 40; 52; 63; 73; 85; 95; 105; 114; and 125. This cumulative sum array may then be used to calculate the "n" number of mean values at the operation 404, such as the first and second mean value. To begin, the mean value for the window 420(N) may comprise the cumulative sum for this window size of "n" values divided by the value of "n". In this example, the cumulative sum is equal to 125 while the value of "n" is equal to 12. Thus, the mean value 422(N) for the window 420(N) is equal to 10.417. Further, to calculate the mean value 422(2) for the window 420(2), the operation may include subtracting the cumulative sum at the position just prior to the beginning of the window 420(2) from the cumulative sum for the entire window 420(N). Thus, determining the mean value 422(2) may comprise subtracting 20 (at the second position, just prior to the start of the window 420(2)) from the entire cumulative sum of 125, resulting in a difference of 105. This difference may then be divided by the number of weight measurements associated with the window 420(2) (in this example 10). Thus, the mean value 422(2) may comprise 10.5.

Further, to calculate the mean value 422(1) for the window 420(1), the operation may include subtracting the cumulative sum at the position just prior to the beginning of the window 420(1) from the cumulative sum for the entire window 420(N). Thus, determining the mean value 422(1) may comprise subtracting 40 (at the second position, just prior to the start of the window 420(1)) from the entire cumulative sum of 125, resulting in a difference of 85. This difference may then be divided by the number of weight measurements associated with the window 420(1) (in this example 8). Thus, the mean value 422(1) may comprise 10.625.

It is to be appreciated that by calculating the mean values in this manner (e.g., using a cumulative sum array), the techniques may more efficiently and quickly determine the number of "n" mean values, which in turn may result in more quickly determining the overall weight estimation using the process 400. Further, it is to be appreciated that the cumulative sum array may be recomputed each time the signal 416 is updated, resulting in a new, most-recent weight measurement and resulting in new mean values 422(1)-(N).

After the mean values 422(1)-(N) have been computed, meanwhile, an operation 406 represents calculating a mean value of the n mean values calculated at the operation 404, and storing this mean value as the current weight estimation of the basket of the cart. In some instances, the operation 406 comprises calculating this mean of the mean values according to the following equation:

$$WeightEstimate = \frac{\sum_k mean_k}{k}$$

where $k$ = number of mean windows

An operation 408 represents determining whether the current weight estimation is stable. For example, this operation may include determining, from the n number of mean values, a largest mean value and a smallest mean value. Thereafter, the algorithm may determine a difference between the largest and smallest mean value and may compare this to a threshold. This operation may determine whether the weight is stable according to the following equation:

$$stable = 1 \text{ if } \max(mean_k) - \min(mean_k) <= \delta$$
$$= 0 \text{ otherwise}$$

An operation 410 comprises determining whether the weight has been determined to be stable. If so, then an operation 412 stores an indication that the weight is stable. If not, then an operation 414 stores an indication that the weight is not stable. For example, the operation 412 may output an indication of one (1) if the weight is determined to be stable and the operation 414 may output an indication of zero (0) if not.

Figure 5A:
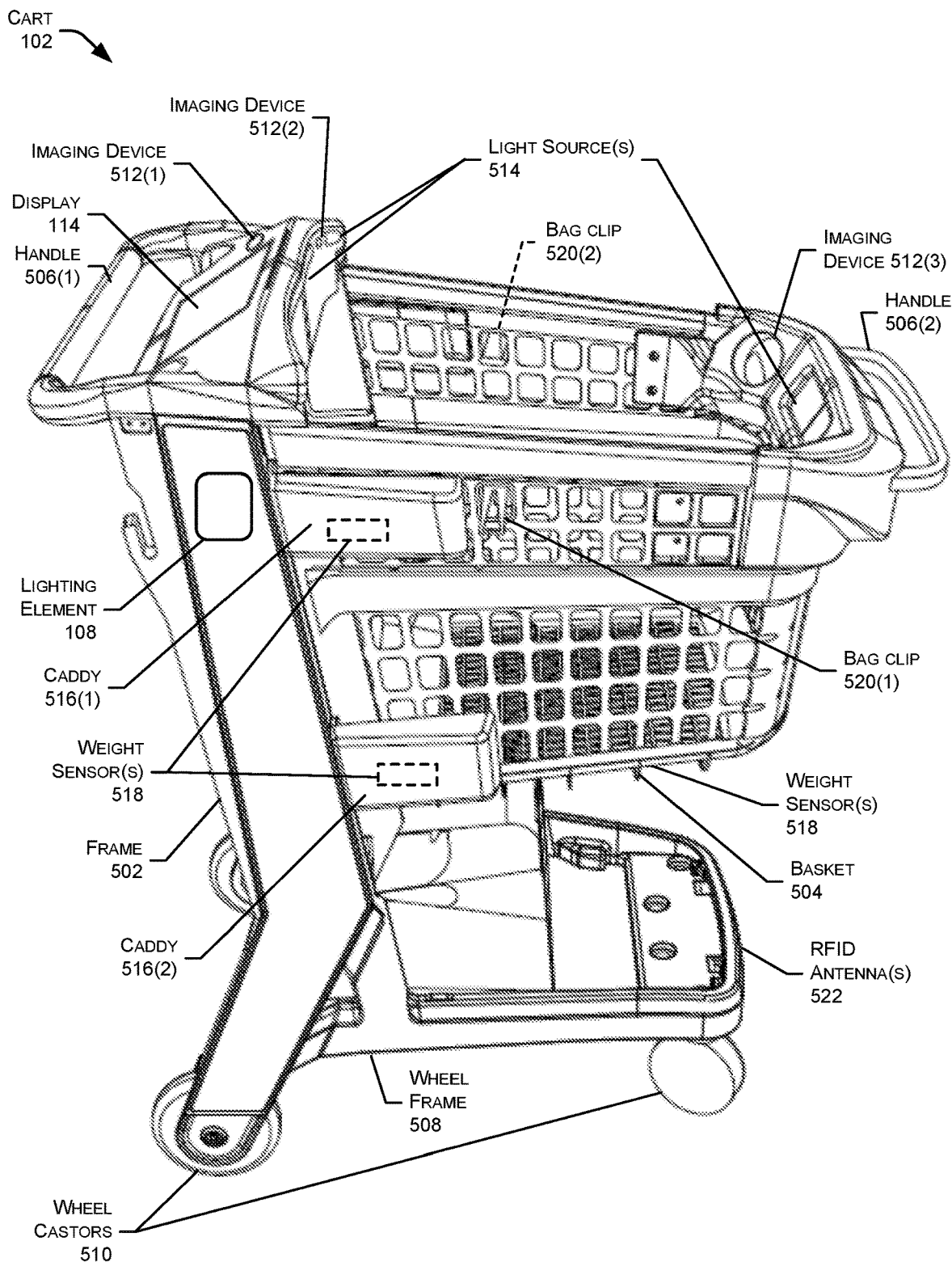
FIG. 5A illustrates a perspective view of an item-identifying cart that may be configured to identify items placed therein (e.g., using image data generated by one or more cameras mounted to the cart) and, thereafter, to determine the outcome of events involving the identified items (e.g., using one or more weight sensors mounted to a frame of the cart). As illustrated, the cart, may include one or more weight sensors, such as a weight sensor disposed on a bottom portion of a basket of the cart.

FIG. 5A illustrates a perspective view of an item-identifying cart 102 that may be configured to identify items placed therein (e.g., using image data generated by one or more cameras mounted to the cart) and, thereafter, to determine the outcome of events involving the identified items (e.g., using one or more weight sensors mounted to a frame of the cart).

As illustrated, the cart 102 may generally include or be formed of a frame 502, a basket 504, a first handle 506(1) for pushing the cart 102, a second handle 506(2) for pulling the cart, a wheel frame 508, and one or more wheel castors 510 to enable movement of the cart 102 on a surface. The frame 502, the basket 504, the handles 506, and the wheel frame 508 may be formed from any suitable materials such as plastics, wood, metals, composites or any other combinations of materials. Moreover, frame 502, the basket 504, the handle 506, and the wheel frame 508 may take any form.

The basket 504 may generally be part of the frame 502 and/or supported by the frame 502 (e.g., be welded, fused, adhered, bolted, screwed, molded, or otherwise joined to the frame 502). In some examples, the basket 504 may comprise a grid or lattice-like structure (e.g., a honeycombed arrangement or framework) having one or more bars or members that are welded, fused, adhered, bolted, screwed, molded, stitched or otherwise joined in a substantially perpendicular alignment with respect to one another. The basket 504 may generally be any shape that defines an interior cavity, or receptacle, for receiving items 104 that are placed in the cart 102. The basket 504 may comprise a bottom, multiple sides protruding from the bottom, and a top. As illustrated, the bottom basket 504 may be in the shape of a quadrilateral such that there are four sides protruding from the bottom of the basket 504. Similarly, the top of the basket 504 may be defined according to the quadrilateral shape and have a perimeter with four corners. The perimeter of the top of the basket 504 may define an opening to the interior cavity (or receptacle) of the basket 504 to receive items placed inside the basket 504. In various examples, the perimeter of the top of the basket may be disposed in a substantially horizontal plane (e.g., a plane substantially along the x-axis as illustrated), and the frame 502 may include at least one vertical member that extends downward from the basket 504 to the wheel frame 508 along a substantially vertical plane (e.g., a plane substantially along the y-axis as illustrated).

The wheel frame 508 may support one or more wheel castors 510 to enable movement of the cart 102 along a surface. The wheel castors 510 include one or more wheels, axles, forks, joints or other components which enable the cart 102 to travel on various surfaces. For example, in some implementations each of the wheel castors 510 may include a single wheel provided on an axle within a fork, or two or more wheels provided on such an axle. In some other implementations, the wheel castors 510 may include two or more axles. Alternatively, in still other implementations, a single caster may be provided in lieu of the multiple wheel castors 510. In accordance with the present disclosure, the wheel castors 510 may operate in any manner, such as being configured to pivot or swivel, and thus automatically adjust or align with a direction of travel. In some examples, the cart 102 may be equipped with other apparatuses for enabling the cart 102 to travel on solid surfaces, including one or more wheeled components other than casters, including but not limited to omnidirectional wheels, spherical wheels or other like apparatuses. Additionally, in some other implementations, the cart 102 may include two or more skis or other runners for traveling on smooth surfaces. In still other implementations, the cart 102 may be levitated, e.g., by magnetic levitation through the use of one or more linear induction motors. Moreover, the cart 102 may be propelled or pushed by humans or autonomous mobile robots or, alternatively, by one or more motors (e.g., electric-powered or gasoline-powered).

As illustrated, the cart 102 may include a first imaging device 512(1), for identifying a user operating the cart as described above, and additional, second imaging devices 512(2), 512(3), 512(4) . . . , 512(N) that include components for use in identifying items placed in the basket 504 and removed from the basket 504. The imaging device 512(1) may, in some instances, be positioned in a manner such that an FOV of the imaging device 512(1) is away from the basket 504 and substantially towards the first handle 506(1) where a user may typically operate the cart 102. The imaging devices 512(2)-(N) may be positioned at any location on the cart 102 (e.g., in the basket 504, on the basket 504, mounted to the frame 502, mounted to the basket 504, and/or any other location), oriented to have respective FOVs for identifying events that occur within and proximate to the basket 504. In some examples, the cart 102 may include at least four of the second imaging devices 512(1), 512(2), 512(3), and 512(N) that are disposed or coupled proximate to four corners of the top of the basket 504. In some examples, one or all of the components of the second imaging devices may be disposed internal to the form factor of the basket 504 and/or frame 502, at least partially internal to the form factor of the basket 504 and/or frame 502, and/or entirely external to the form factor of the basket 504 and/or frame 502 (e.g., mounted to the cart 102). However, in the illustrated example, the second imaging devices may be disposed at locations proximate to the four corners of the top or perimeter of the basket 504/frame 502. In some instances, the less that the second imaging devices protrude from the form factor of the cart 102, the more efficiently the carts 102 may be nested with respect to each other.

As described in further detail below with respect to FIG. 5B, the cart 102 may further include one or more one light sources (e.g., LEDs) for emitting light at or prior to the time of the second imaging devices generating the second image data. The cart 102 may further include, in some instances, one or more proximity sensors (e.g., ToF sensor, PIR sensor, etc.). In some examples the proximity sensors may be activated to detect the proximity of items 104 or other objects above the top of the basket 504. The proximity sensors may be configured to generate sensor data that indicates distances between objects above the top of the basket 504 of the cart 102 and the second imaging devices. The cart 102 may include components configured to analyze the sensor data and determine that an item 104 is within some threshold distance from the top of the basket 504 and/or within the basket 504. Upon detecting an object within the threshold proximity of the basket 504 using the proximity sensor, one or more components of the cart 102 may cause the light sources (LEDs) to emit light and the second imaging devices to generate image data. In some examples, the FOVs of the second imaging devices 512(2)-(N) may each at least partially overlap at a location above the top of the basket 504 corresponding to a centroid of the quadrilateral defining the top of the basket 504. The light sources may illuminate the basket 504 and/or the area above the top of the basket 504 to illuminate items 104 being placed in the cart 102, or removed from the cart 102, to act as a "flash" for the cameras that are generating image data. The second imaging devices may generate image data for a predefined period of time and/or until the proximity sensors (or the image data itself) indicates that there is no longer an object within the threshold distance from the cart 102 or top of the cart 102.

After generating the image data, one or more components of the cart 102 may process the image data to determine an item identifier for the item(s) 104 represented in the image data, and an event 106 for the image data (e.g., addition of an item 104 to the cart, removal of an item 104 from the cart). In some instances, the cart 102 may include component(s) to determine an item 104 identifier for the item 104 (e.g., name of the item 104, SKU number for the item 104, etc.), and determine if the item 104 is being taken from the cart 102, or added to the cart 102, based on the motion of the item 104 and the result of the movement around the cart 102 once movement is no longer detected and represented by the image data. In other instances, the image data may be analyzed to identify the item, while the weight data may be analyzed as described above and below for determining the event associated with the item.

In either of these instances, the components of the cart 102 may then update a virtual shopping cart associated with the cart 102 that indicates a virtual listing of items 104 taken by the user 202 from the facility based on the determined event 106. In some examples, the image data may be transmitted to the server(s) 212 over the network(s) 214 where the processing may be performed.

In various examples, the cart 102 may include a display 114 to present various information in user interface(s) for the user 202 to consume. In some examples, the display 114 may comprise a touch screen to receive input from the user 202 (e.g., a selection of an item identifier to disambiguate amongst potential item identifiers). In some instances, the display 114 may present customized information to the user 202 upon identifying the user 202, such as a shopping list of the user or the like. Further, the display 114 may be used to provide feedback to the user when one or more items have been identified and to update a virtual shopping cart of the user when one or more event(s) associated with these items have been determined. The display may also be used to indicate when components of the cart 102 are unable to identify an item or resolve an event associated with an item. In these instances, the display may present a request that a user perform some action, such as input on the display a result of the event, hold the item(s) in front of the imaging devices 512, or the like.

The cart 102 may further include a battery pack module that houses one or more batteries to power the components of the cart 102. The battery pack module may include rechargeable batteries. In some examples, the battery pack module may be detachably coupled to the wheel frame 508 and/or the frame 502 of the cart 102 such that the battery pack module may be removed and taken to a charging station. In various examples, the battery pack module may include rechargeable batteries that may be charged when the cart 102 is placed in a cart corral 208 (e.g., through electrical contacts, power cords, etc.). In various examples, the frame 502 and/or basket 504 may have one or more channels (e.g., grooves, holes, paths, tunnels, etc.) through which power cables/cords may pass. In this way, power cables may be run at least partially through the channels in the frame 502 and/or basket 504 inconspicuously to provide power to the various components of the cart 102.

In some instances, the cart 102 may further include one or more lighting elements 108 disposed on the frame 502 and/or basket 504 of the cart 102. The user 202 may, in some instances, operate a controller to turn on (and off) the lighting element(s) 108 to cause the lighting element(s) to emit light. Further, in some instances the controller may enable the lighting element(s) 108 to transition between multiple light states, such as different colors, flashing effects, and/or the like. The controller operable by the user 202 may comprise functionality accessible to the user 202 via the display (e.g., one or more soft buttons for turning on and/or off the light), a physical toggle switch on the frame 502 of the cart 102, and/or the light. Further, the lighting element(s) 108 may be used to signal a predefined state of the cart 102 and/or the user 202. For example, the user 202 may turn on the lighting element(s) 108 to indicate that he or she requests assistance from an associate of the facility 200, or for any other reason. In some instances, in response to the user 202 operating a controller to request assistance, the cart 102 may perform one or more actions in addition to turning on the lighting element(s) 108. For example, the display may present content responding to this request, such as an offer to connect the user 202 with an associate of the store (e.g., in person, via I/O devices of the cart, etc.). For example, in response to requesting assistance, the cart 102 may facilitate an audio-only or an audio/video call between the user 202 and an associate of the facility using one or more I/O devices on the cart, such as the display, one or more speakers, one or more microphones, one or more cameras pointed toward the user 202 and/or the like.

In still other instances, associates of the facility may, remotely or otherwise, operate the lighting element(s) 108 to change states (e.g., turn on or off) and/or the cart 102 may include components to automatically change a state of the lighting element(s) 108. For example, upon the card identifying that an item of a predefined class of items has entered the basket, the cart 102 may cause the lighting element(s) 108 to change state (e.g., from an off state to an on state) to indicate that an additional checkout workflow may now be required. For example, if the user 202 places an item into the basket 504 that requires the purchasing user to be of a certain age (e.g., alcohol) or to have a certain prescription (e.g., medicine), the cart 102 may illuminate the lighting element(s). In some instances, the cart 102 may include a lighting element on a right side of the frame, a lighting element on a left side of the frame, and/or one or more other lighting elements in other locations on the cart 102. In still other instances, the lighting element(s) 108 may be illuminated to provide feedback to the user operating the cart. For example, the lighting element may be instructed to illuminate green in response to the cart identifying an item and orange in response to the cart failing to identify an item or resolve an event associated with an identified item.

FIG. 5A further illustrates that the cart may include the first imaging device 512(1) for identifying a user, the one or more second imaging devices 512(2)-(N) for identifying items placed into or removed from the basket 504, the display 114 for presenting information to a user operating the cart 102, and the one or more lighting elements 108. In addition, the cart 102 may include one or more light sources 514 that function to emit light prior to and/or while the second imaging devices 512(2)-(N) generate the second image data for identifying items placed into and removed from the basket 504. In some instances, these light sources 514 emit constant light, while in other instances the light sources 514 emit light in a strobing manner. In either of these instances, the light may be visible and/or non-visible light.

In addition, the cart may include one or more caddies, such as a caddy 516(1) and a caddy 516(2), coupled to the left and/or right side of the frame or basket of the cart 102. For example, the cart 102 may include the first and second caddies 516(1) and 516(2) on the right side of the cart, and two similarly situated caddies on the left side of the cart (not shown). Each caddy may define a receptacle (e.g., having an opening at the top) for housing one or more items therein. In some instances, the caddies may be beyond the FOV of the second imaging devices 512(2)-(N) such that the user is able to place personal items (e.g., keys, wallet, phone, etc.) into the receptacle defined by the respective caddy without the imaging devices 512(2)-(N) generating image data corresponding to this addition. In other instances, the caddies may be within the FOV of one or more of the imaging devices.

In addition, one or more of the caddies may include one or more respective weight sensors 518 for determining a current weight of the basket 504 and, thus, items in the basket 504. For example, each caddy may comprise a respective weight sensor 518 comprising a strain gauge or other sensor that continuously or periodically may be used to determine a weight of the basket and/or whether a change in weight has occurred. As illustrated, the cart 102 may include two weight sensors 518 on each side of the basket 504. Each pair of weight sensors 518 may, in some instances, reside along the same vertical axis. That is, a top weight sensor on the right side of the basket 504 may reside above a bottom weight sensor on the right side. In some instances, meanwhile, the cart 102 may additionally include a weight sensor 518 at the bottom of the basket, or the cart 102 may comprise a single weight sensor 518 residing at the bottom of the basket (and, thus, might not include the weight-sensor pairs on the side of the basket).

This weight data may be used to identify when items have been placed into or removed from the basket and, in some instances, may be used to identify items placed into or removed from the basket. For example, the weight data may be used to determine the identity of an item placed into or removed from the basket (e.g., to identify that a bottle of ketchup was placed into the basket), identify a number of instances of an item (e.g., a number of bottles of ketchup placed into the basket), to measure an amount of something (e.g. 1 pound of peanuts), and/or the like.

FIG. 5A further illustrates that the cart 102 may include one or more bag clips, such as a bag clip 520(1) on a right side of the basket 504 and a bag clip 520(2) on a left side of the basket 504. As illustrated, the bag clips 520 may reside on an outside, top portion of the basket such that a user may place a bag into the interior of the basket while securing a first strap of the bag to the first clip 520(1) and a second strap of the bag to the second clip 520(2). Thereafter, the user may place items into and/or remove items from the bag. At the end of the shopping session, the user may remove the bag containing the items from the basket (e.g., by removing the straps from the clips) and exit the facility.

FIG. 5A further illustrates that the cart 102 may include one or more RFID antenna(s) 522, which may be used for determining a location of the cart 102 within the facility 200. In some instances, the inventory locations 204 may include respective RFID tags that may be read by the RFID antennas 522 of the cart. In some instances, the cart 102, or a remote system communicatively coupled to the cart 102, may store map data that indicates associations between respective location with the facility to respective RFID tags throughout the facility. As illustrated, in some instances the RFID antennas 522 may reside near a bottom portion of the frame of the cart. In other instances, however, the RFID antennas 522 may reside at other locations on the cart 102 and/or distributed at multiple locations on the cart 102.

Figure 5B:
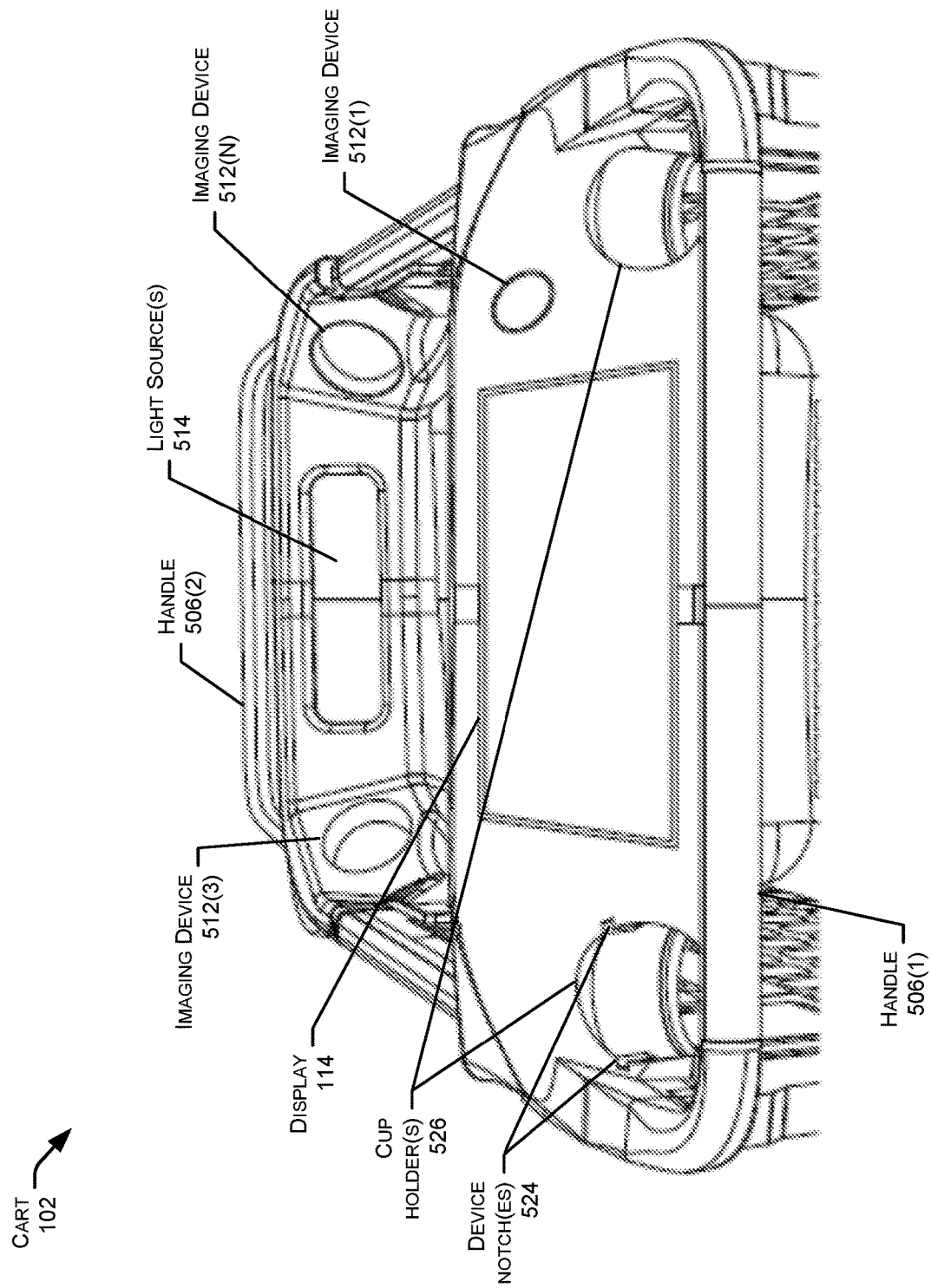
FIG. 5B illustrates a front view of the example item-identifying cart of FIG. 5A. As illustrated, the cart may include a display, which may be used to provide feedback to a user operating the cart.

FIG. 5B illustrates an example front view of the cart 102. As illustrated, the cart includes the first handle 506(1) for pushing the cart 102, the second handle 506(2) for pulling the cart 102, the imaging device 512(1) for generating data for assigning a unique but potentially anonymous identifier to a user operating the cart, the second imaging devices 512(2)-(N), and the display 114 to present content to the user operating the cart. The front view also illustrates that the cart may include the light source(s) 514 between the imaging device 512(3) and 512(N). In some instances, the cart may further include a light source to the left of the imaging device 512(3) and/or a light source to the right of the imaging device 512(N).

In addition, the cart 102 may include one or more cup holders 526 (in this example, on the left and right sides of the display 114) for holding respective cups of the user. In addition, each cup holder may include one or more device notches 524, comprising recesses of the cup holder in which a user may secure a device, such as a mobile phone or the like. That is, the device notches 524 may provide respective slots in which a user may place an electronic device, such as a phone, in a manner in which the device is secure while a display of the device is oriented towards the user operating the cart. Thus, the user, may engage in the shopping session while having a shopping list or the like displayed on a device that sits securely in the device notches 524 of the cup holder 526.

Figure 5C:
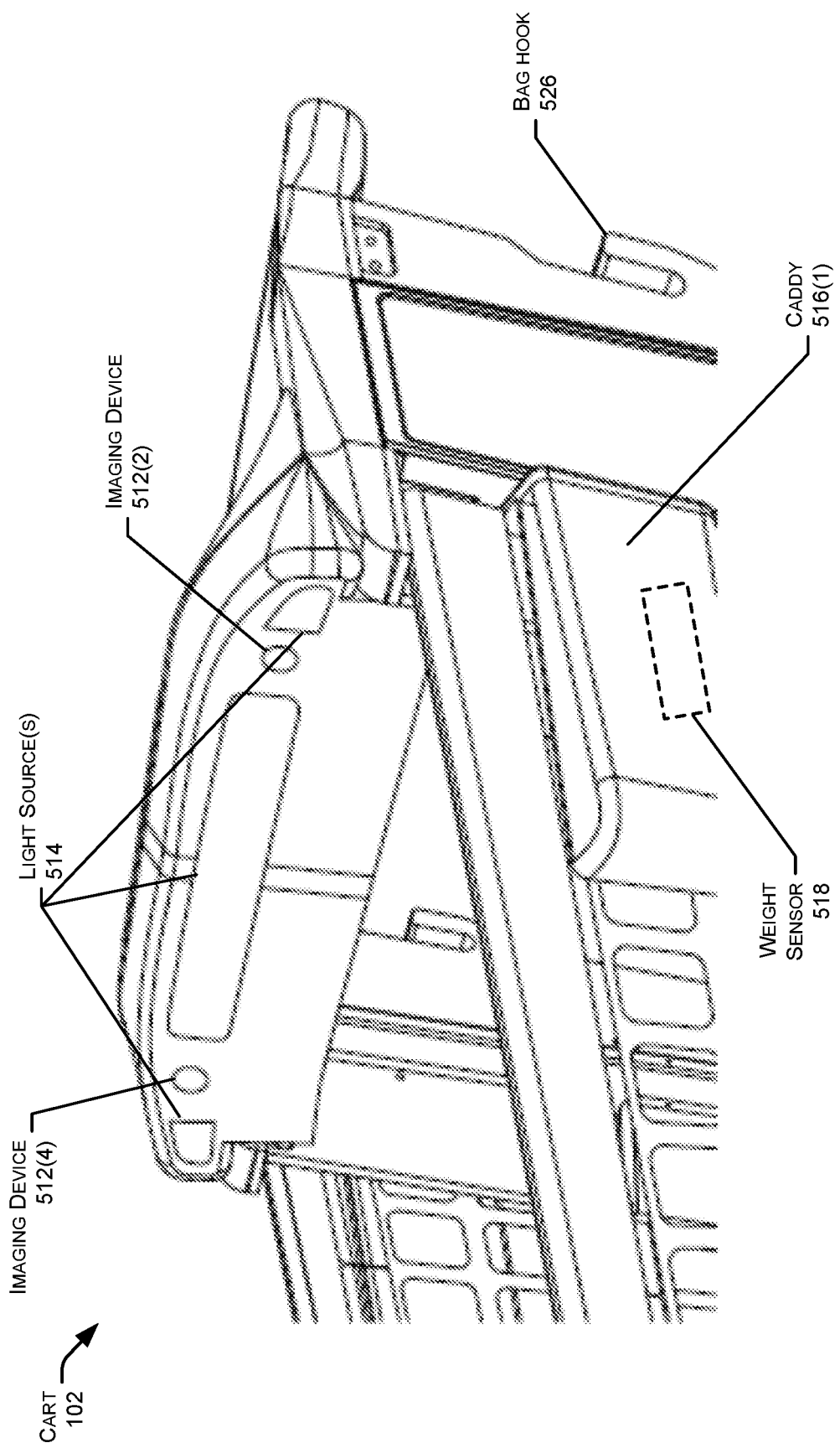
FIG. 5C illustrates yet another view of the example item-identifying cart of FIG. 5A. As illustrated, the cart may include one or more cameras for generating image data for identifying items placed into or removed from a basket of the cart. In addition, the cart may include one or more weight sensors for generating a current weight of the basket, which may be used to determine results of events involving the identified items.

FIG. 5C illustrates a closer view of one or more imaging devices 512(2) and 512(4) having an FOV substantially towards the basket of the cart. This figure also illustrates that the cart 102 may include one or more light sources 514 between the imaging devices 512(2) and 512(4), to the left of the imaging device 512(3), and/or tot the right of the imaging device 512(2). In addition, FIG. 5C illustrates an example caddy 516(1), which may define a receptacle for housing one or more items, as discussed above. Further, one or more weight sensors 518 may reside within or adjacent to the caddy 516(1) for generating weight data indicating a weight or change in weight of the basket. Finally, this figure illustrates that the frame 502 of the cart 102 may include one or more bag hooks 526, comprising hooks in which a user operating the cart 102 may secure one or more bags. In some instances, the cart 102 may include a bag hook on a rear-left side of the frame (e.g., near a user operating the cart) and/or a bag hook on a rear-right side of the frame.

Figure 6A:
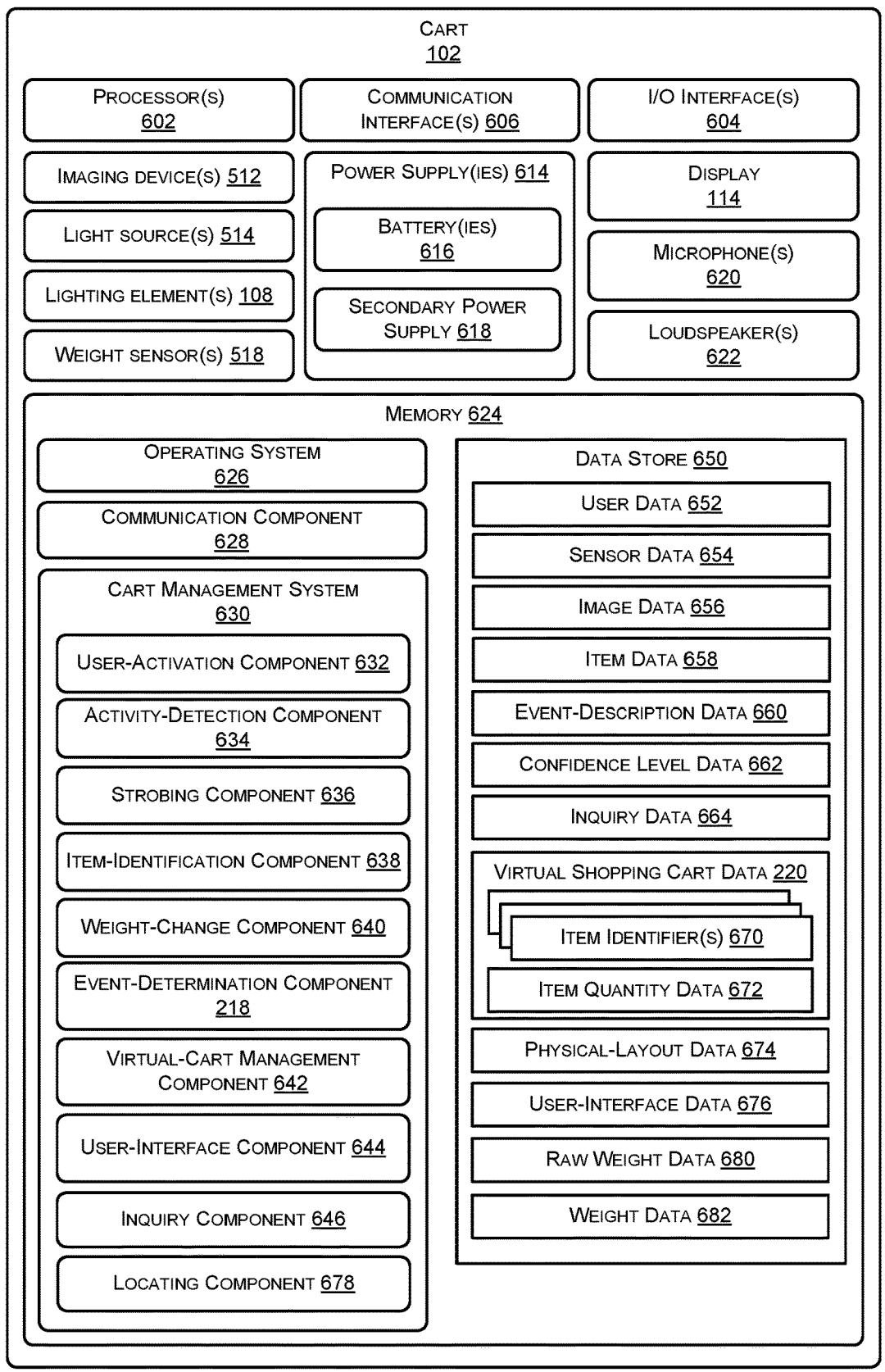
FIG. 6A illustrates example components of an item-identifying cart configured to support at least a portion of the functionality of a cart management system.

FIG. 6A illustrates example components of an item-identifying cart (e.g., carts 102 and/or 500) configured to support at least a portion of the functionality of a cart management system.

The cart 102 may include one or more hardware processors 602 (processors) configured to execute one or more stored instructions. The processors 602 may comprise one or more cores. The cart 102 may include one or more input/output (I/O) interface(s) 604 to allow the processor 602 or other portions of the cart 102 to communicate with other devices. The I/O interfaces 604 may comprise Inter-Integrated Circuit (I2C), Serial Peripheral Interface bus (SPI), Universal Serial Bus (USB) as promulgated by the USB Implementers Forum, and so forth.

The cart 102 may also include one or more communication interfaces 606. The communication interfaces 606 are configured to provide communications between the cart 102 and other devices, such as the server(s) 212, sensors, interface devices, routers, and so forth. The communication interfaces 606 may include devices configured to couple to personal area networks (PANs), wired and wireless local area networks (LANs), wired and wireless wide area networks (WANs), and so forth. For example, the communication interfaces 606 may include devices compatible with Ethernet, Wi-Fi™, and so forth. The cart 102 may also include one or more busses or other internal communications hardware or software that allow for the transfer of data between the various modules and components of the cart 102.

The cart 102 may also include the one or more imaging devices 512, such as the first imaging device 512(1) for identifying a user operating the cart and one or more second imaging devices 512(2)-(N) for identifying items placed into and removed from a basket of the cart. The cart 102 may further include the light sources 514, the lighting elements 108, and the weight sensors 518 described above. In some instances, the cart 102 further includes include one or more proximity sensors comprising any type of sensor that is able to detect the presence of nearby objects without the need for physical contact (e.g., ToF sensors, PIR sensors, etc.). The imaging devices, meanwhile, may comprise any type of camera or imaging device configured to generate image data (and/or video data) or information descriptive of a plurality of picture elements or pixels. Additionally, in some instances the cart 102 may include one or more imaging devices that are outward-facing and that generate image data representing the facility 200 around the cart 102.

The cart 102 may include one or more power supply(ies) 614 to provide power to the components of the cart 102. The power supply(ies) 614 may include one or more batteries 616 and a secondary (e.g., internal) power supply 618 to allow for hot swapping of battery packs, such as one or more capacitors, internal batteries, etc.

The cart 102 may also include a display 114 configured to display image data, such as pictures, videos, user interface elements, and/or any other image data. The display 114 may comprise any type of display 114 and may further be a touch screen to receive touch input from a user. The cart 102 may also include one or more microphones 620 and one or more loudspeakers 622 to facilitate a dialogue with a user 202, and/or to receive feedback from the user 202. The microphone(s) 620 may capture sound representing the user's speech, and the loudspeaker(s) 622 may output machine-generated words to facilitate a dialogue, prompt a user 202 for feedback on an item 104 and/or for other information, and/or output other alerts or notifications.

The cart 102 may include one or more memories 624. The memory 624 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 624 provides storage of computer-readable instructions, data structures, program modules, and other data for the operation of the cart 102. A few example functional modules are shown stored in the memory 624, although the same functionality may alternatively be implemented in hardware, firmware, or as a system on a chip (SOC).

The memory 624 may include at least one operating system (OS) component 626. The OS component 626 is configured to manage hardware resource devices such as the I/O interfaces 604, the communication interfaces 606, and provide various services to applications or components executing on the processors 602. The OS component 626 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 624. These components may be executed as foreground applications, background tasks, daemons, and so forth. A communication component 628 may be configured to establish communications with one or more of the sensors, one or more of the servers 212, or other devices. The communications may be authenticated, encrypted, and so forth.

The memory 624 may further store a cart management system 630. The cart management system 630 is configured to provide the item-identifying and event-determining functions (and other functions) provided by the cart 102 as described herein. For example, the cart management system 630 may be configured to assign an identifier to a user operating a cart, identify items 104 placed into the cart, determine results of events involving these items, and maintain a corresponding virtual shopping cart for a user 202 of the cart 102. While these components are described as operating on the cart 102, in some instances some or all of these components reside additionally or alternatively on the servers 212 or elsewhere.

The cart management system 630 may include a user-activation component 632 that performs operations for activating a shopping session using a cart 102 on behalf of a user 202. For instance, a user 202 may have previously registered for a user account with an operator of the facility to utilize various automated management services provided by an operator of the facility 200. The user 202 may have registered for a user account, such as by providing user data 652, to automate payments made for items taken by the user and included a payment means (e.g., credit card, bank account number, etc.), and may have also provided an identification means in the user data 652 to the user-activation component 632 such that the cart 102 can recognize the user 202. For instance, the user 202 may have registered to identify themselves to the cart 102 using any identification technique by the user-activation component 632, such as by providing user data 652 by presenting an identification means to the first imaging device 512(1) (e.g., presenting a driver's license, presenting a facility-issued card, presenting a user identifier via a mobile phone, etc.), speaking a predefined utterance that is captured by the microphone(s) 620 (e.g., a name of the user, a predefined keyword, etc.), and/or providing other recognition information. Once a user 202 has identified themselves to using the user-activation component 632, the user-activation component 632 may open a shopping session where the cart 102 identifies and track items 104 retrieved by the user 202 and placed in the cart 102.

The cart management system 630 may additionally include an activity-detection component 634 configured to detect items 104 (or objects) within a particular proximity to the cart. For example, one or more proximity sensor(s) (if present) may generate sensor data 654 that indicates a distance between the proximity sensor(s) and any objects located in the FOV of the proximity sensor(s). The activity-detection component 634 may analyze the sensor data 654 and determine if an object is within a threshold distance indicating that the object is near the cart 102 and/or within or near the perimeter of the top of the basket 504 of the cart 102 (e.g., one foot from the proximity sensor(s), two feet from the proximity sensor(s), etc.). In this way, the proximity sensor(s) may generate sensor data 654 that indicates whether or not an item 104 is being moved in or out of the basket 504 of the cart 102. However, in some examples, rather than using sensor data 654 generated by a proximity sensor(s), the activity detection component 634 may utilize image data 656 generated by the imaging devices 512(2)-(N) to determine if an object is within a threshold distance from the cart 102. Further, and as described above, in some instances the event-determination component 218 may refrain from determining the result of an event until after the activity-detection component 634 determines that there any activity occurring within the basket 504 of the cart 102 has ceased.

The cart management system 630 may further include a strobing component 636 configured to cause the light sources 514 and/or shutters of the imaging devices 512 to strobe according to different frequencies. As noted above, the light sources 514 may emit light in any light spectrum (e.g., infrared, near infrared, visible, etc.). However, some items 104 may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the light sources 514 to emit light in the visible spectrum. When generating image data 656 using the imaging devices 512, motion blur may appear when capturing fact moving objects. However, the motion blur may be reduced or eliminated by exposing the imaging device's imager for a short (e.g., sub-millisecond) durations. Accordingly, the strobing component 636 may strobe the opening and closing of shutters of the imaging devices 512 to limit the sensor exposure duration. Additionally, the strobing component 636 may cause the LEDs to emit/strobe light at a particular frequency, as discussed further with respect to FIG. 10. In some instances, the strobing component 636 may cause the LEDs to strobe at a first rate (e.g., 1200 hertz) prior to detecting predefined activity, such as a user placing an item into or removing an item from a cart, while causing the LEDs to strobe at a second, different rate (e.g., 60 hertz) upon identifying the predefined activity. Further, the LEDs may emit light in the visible range in some instances, and in the non-visible range in other instances. In some examples, the LEDs may comprise RGB LEDs that may be mixed according to different respective levels to tune a resulting color of the LEDs.

The cart management system 630 may also include an item-identification component 638 configured to analyze image data 656 to identify an item 104 represented in the image data 656. The image data 656 may comprise information descriptive of a plurality of picture elements, or pixels, for one or more image frames (e.g., a still picture, multiple picture frames, video frames, etc.). The item-identification component 638 may analyze the image data 656 using various image-processing techniques, or computer-vision techniques. For instance, the item-identification component 638 may extract a representation of an item 104 depicted in the image data 656 generated by at least one imaging device 512. The representation may include identifying text printed on the item 104, colors or color schemes printed in the item, determining 2-D and/or 3D shapes of the items 104, and/or other techniques for extract a representation of the item 104. In some instances, the representation of the item 104 depicted in the image data 656 may comprise a numeric representation, such as a feature vector or a set of feature vectors. In some instances, the item-identification component 638 identifies a barcode associated with a particular item.

The cart management system 630 may further include a weight-change component 640 in some instances. The weight-change component 640 may be configured to receive raw weight data 680, in the form or respective signals, from the weight sensors, combine these signals into a single signal representing weight measurements over time, and perform the algorithms described above for determine a current weight estimation of the basket of the cart. The weight-change component 640 may store this weight estimation as weight data 682. For example, the weight-change component 640 may perform the operations of FIG. 4A (and FIG. 7 discussed below) for determining a current weight estimation of the basket and outputting an indication of whether this weight is stable. The weight-change component 640 may also be configured to determine whether the current estimated weight represents a weight change that is greater than a threshold and, if so, may output a value of this weight-change data as part of weight data 682 for determining the outcome of one or more events, as described above.

In some examples, a data store 650 stored in the memory 624 may include item data 658, which may include representations of the items 104 offered for acquisition at the facility 200. The item-identification component 638 may compare the extracted represented of the item 104 with the "gallery" or stored representations of the known items 104 in the item data 658. In some instance, the item representation may include an indication of a barcode or SKU data for the item 104 as recognized in, or extracted from, the image data 656. The item-identification component 638 may determine confidence level data 662 based on the comparisons with item representation in the item data 658. The item-identification component 638 may determine, and assign, confidence levels indicating how likely it is that the item 104 represented in the image data 656 corresponds to an item from the item gallery in the item data 658. Based on the confidence level data 662, the item-identification component 638 may determine an item identifier 670 for the item in the image data 656 (or multiple item identifiers 670) that corresponds to an item in the item data 658 to which the item 104 corresponds. Further, and as described above, feedback may be provided to the user in response to the item-identification component 638 determining an identifier of an item with a confidence level that is greater than a threshold confidence level. For example, the lighting element 108 may emit green light, the display 114 may present an image or other identifying information associated with the item, or the like.

In some examples, the data store 650 may include physical-layout data 674 that is used by the item-identification component 638 to determine the item 104. The physical-layout data 674 may include or provide a mapping of physical locations within the physical layout of devices and objects such that the location of the cart 102 may be utilized to determine an item 104 stored nearby. The physical-layout data 674 may indicate the coordinates within the facility 200 of an inventory location 204, items 104 stored at that inventory location 204, and so forth. In examples where the cart 102 has location determining sensors (e.g., GPS, RFID, proximity, etc.), the location sensor data may be used to determine where in the store the user 202 is. In such examples, the item-identification component 638 may access the physical-layout data 674 to determine if a location associated with the event is associated with items 104, and confidence levels for the corresponding representations of items in the item data 658. Continuing the example above, given the location within the facility 200 of the event and image camera data, the physical-layout data 674 may determine the items 104 that may have been represented in generated images of the event 106.

The cart management system 630 may further include the event-determination component 218 to determine event-description data 660 for the item 104 in the image data 656. The event-determination component 218 may determine if the user 202 is adding an item 104 to the cart 102, removing the item from the cart 102, and/or the like. The event-determination component 218 may also determine a quantity of items involved, as described above. For instance, the event-determination component 218 may receive an indication of any identified items since the last update of the virtual shopping cart, along with weight-change data from the weight sensors to determine the result of one or more events associated with the identified items, as described above. Operation of the event-determination component 218 is described in further detail with reference to FIG. 6B.

The cart management system 630 may also include a virtual-cart management component 642 configured to manage virtual shopping cart data 220 for the cart 102. For instance, the virtual-cart management component 642 may utilize the item data 658, event-description data 660, and confidence level data 662 to add item identifier(s) 670 to the virtual shopping cart data 220 for items 104 that were added to the cart 102, remove item identifier(s) 670 from the virtual shopping cart data 220 for items 104 that were removed from the cart 102, and track item quantity data 672 indicating quantities of particular items 104 in the cart 102. In some instances, the virtual-cart management component 642 updates the virtual shopping cart data 220 in response to receiving information from the event-determination component 218, as described with reference to FIG. 6B below.

The cart management system 630 may further include a user-interface component 644 configured to present user interfaces on the display 114 based on user-interface data 676. The user interfaces 676 may include one or more fields to present data, and/or receive touch input (or other input via a keyboard, mouse, etc.) from a user 202, and/or any of the feedback described above. For instance, if the item-identification component 638 is unable to determine an item identifier 670 for an item 104 shown in the image data 656, the user-interface component 644 may receive inquiry data 664 generated by an inquiry component 646 to prompt a user 202 for feedback to help identify the item 104, and/or other information (e.g., if multiple items were placed in the cart 102). The inquiry component 646 may be configured to generate inquiry data 664 based on the information needed to identify the item 104. For instance, the inquiry data 664 may include a prompt to request particular feedback from the user 202, such as to provide input (e.g., touch input, vocal/utterance input, etc.) to identify the item 104, input to indicate how many items 104 were added to the cart, input to indicate whether an item 104 was removed or added, etc. In some examples, the user-interface component 644 may present one or more images depicting items from the item data 658 that have the highest confidence levels as corresponding to the item 104 in the image data 656, but confidence levels that are not high enough to make a final decision as to the item 104. For instance, the user-interface component 644 may present pictures of two different items that have high confidence levels 862 and request that the user 202 select or indicate the appropriate item 104. Additionally, or alternatively, the user-interface component 644 may present user-interface data 676 that prompts the user for feedback regarding whether or not the item 104 was added to, or removed from, the cart 102.

In some examples, the cart management system 630 may further include a locating component 678 configured to determine locations of the cart 102 in the facility 200. For instance, the locating component 678 may analyze sensor data 654 collected by sensors of the cart 102 to determine a location. In some examples, the communication interface(s) 606 may include network interfaces that configured the cart 102 to receive or detect wireless signals (e.g., WiFi signals, Bluetooth signals, etc.) and generate sensor data 654 indicative of the signals. The locating component 678 may analyze the sensor data 654 using various techniques to identify the location of the cart 102, such as WiFi triangulation, received signal strength indicators (RSSI), and/or other methods for analyzing wireless signals to determine a location of the cart 102. In some instances, the facility 200 may include various infrared (IR) or near-IR emitters at different locations that emit light according to frequencies, patterns, etc. that indicate the different locations in the facility 200. In such examples, the cart 102 may include a light sensor to generate the sensor data 654 representing the IR or NIR and determine the location of the cart 102 in the facility. In some instances, there may be visible landmarks or markers throughout the facility that indicate a location in the facility, and the locating component 678 may analyze image data 656 generated by an outward facing camera to determine a location of the cart 102. As another example, there may be various radio frequency (RF) emitters positioned throughout the store, and the cart 102 may include an RF receiver to allow the locating component 678 to perform IR beaconing to determine the location of the cart 102. The locating component 678 may perform one, or any combination, of the above techniques to determine a location of the cart 102 in the facility and/or any other technique known in the art.

The locating component 678 may perform various operations based on determining the location of the cart 102 within the facility 200. For instance, the locating component 678 may cause user interface data 676 to be presented on the display 114 that includes a map of the facility 200 and/or directions to an item 104 for the user of the cart 102. Additionally, or alternatively, the locating component 678 may utilize the location of the cart, the physical-layout data 674, and/or item data 658 and "push" user interfaces to the display 114 that indicate various location-based information, such as indications of deals for items 104 located nearby, indications of items 104 located nearby and on the user's shopping list, and/or other user interface data 676.

Figure 6B:
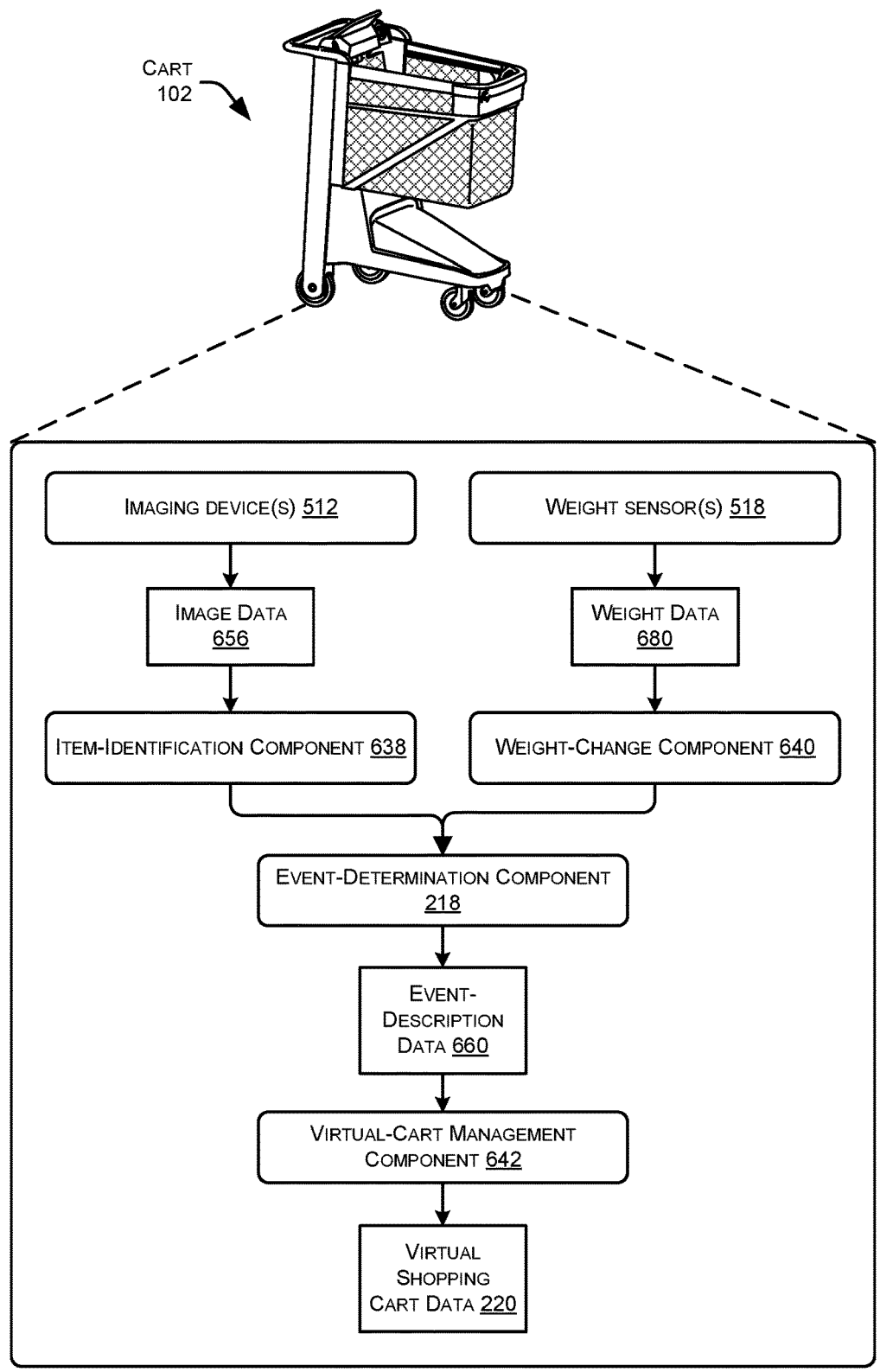
FIG. 6B illustrates some of the example components of FIG. 6A for determining whether to update a virtual cart of a user operating the item-identifying cart. As illustrated, these components may include a weight-change component for determining a current weight of a basket of the item-identifying cart, whether the current weight is stable, and whether the current weight represents a change in weight from a previous weight of the basket.

FIG. 6B illustrates, in further detail, some of the example components of the cart 102 for determining whether to update a virtual cart of a user operating the item-identifying cart 102. As illustrated, the imaging device 512 may generate image data 656, potentially as a user places one or more items into the cart 102 or removes one or more items from the cart 102. The item-identification component 638 receives the image data and may analyze the image data to identify one or more items represented in the image data, as described above.

Furthermore, before, after, and/or during the generating of the image data 656, the weight sensors may generate raw weight data 680 comprising weight signals indicative of a weight of the basket 504 of the cart 102. A weight-change component 640 may receive the raw weight data 680 and may perform the algorithms described herein (e.g., with reference to FIGS. 4A and 7) for determining a current estimated weight of the basket (e.g., weight data 682). For example, the weight-change component 640 may continuously or periodically receive the raw weight data 680, generate a weight estimation (e.g., weight data 682), and determine when the weight data 680 has stabilized. In addition to determining when the weight of the basket has stabilized, the weight-change component 640 may determine when a weight change has occurred. That is, the weight-change component 640 may determine a difference between a current, stabilized weight and a previous weight at a time when the virtual shopping cart data 220 was last updated. If this difference is greater than a threshold, then the weight-change component 640 may provide an indication of this difference to the event-determination component 218.

The event-determination component 218 may receive an indication of any identified items from the item-identification component 638 and an indication of a weight change (and amount) from the weight-change component 640. The event-determination component 218 may then determine the outcome of any events involving the identified items. As described above, the event-determination component 218 may make this determination by looking up a catalog weight associated with each of the identified items and generating one or more hypotheses based on these catalog weight(s), the change in weight of the basket, and one or more other criteria, such as the probability of individual actions. As described above, these actions may be weighted based on prior behavior of the user, behavior of users when interacting with the identified items, behavior of users at the same facility, current contents of the virtual shopping cart data 220, and/or the like.

If the event-determination component 218 determine the outcome of any events involving the identified item with a confidence level that is greater than a threshold confidence level, then the event-determination component 218 may generate the event-description data 660. The virtual-cart management component 642 may receive this event-description data and update the virtual shopping cart data 220 associated with the user operating the mobile cart. For example, if the event description data indicates that it has determined that a user placed three instance of item A into the cart and removed one instance of item B from the cart, the virtual-cart management component 642 may update the virtual shopping cart data 220 to indicate these additions and this removal.

Figure 7:
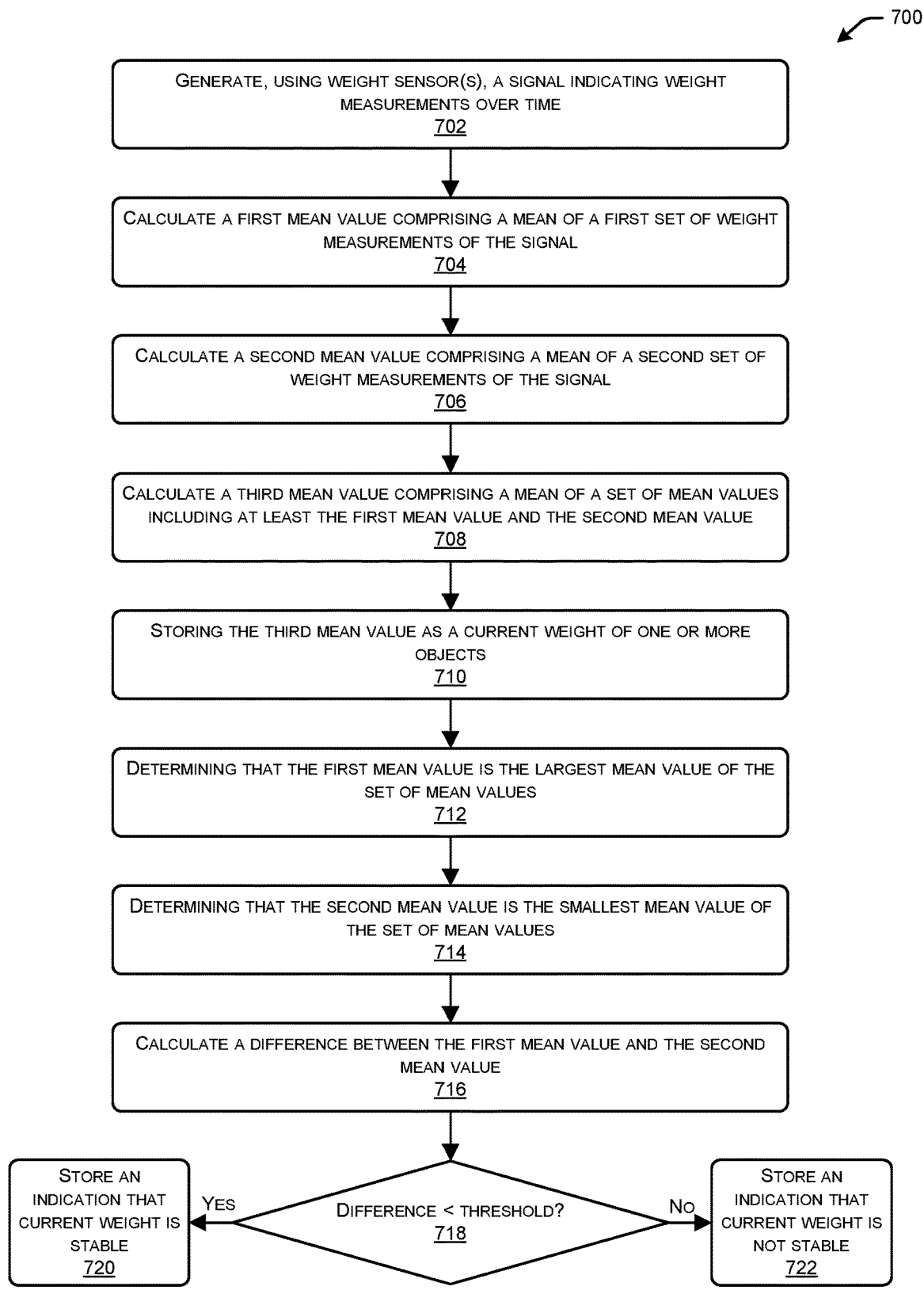
FIG. 7 illustrates a flow diagram of an example process for estimating a weight of one or more objects and determining whether the weight is stable.

FIG. 7 illustrates a flow diagram of an example process 700 for estimating a weight of one or more objects and determining whether the weight is stable. In some instances, the weight-change component 640 may perform some or all of the operations of the process 700, while in other instances one or more other components may perform some or all of these operations.

An operation 702 represents generating, using one or more weight sensors, a signal indicating weight measurements over time. For example, a single weight sensor 518 residing at the bottom of the basket 504 of the example cart 102 may generate a signal (e.g., raw weight data 680) indicative of a series of weight measurements of the basket over time. For example, the weight sensor may generate signal similar to the signal 416 illustrated in FIG. 4B. In another example, multiple weight sensors (such as the illustrated pairs of weight sensors 518 on the side of the basket 504 of the example cart 102) may generate respective signals, which may be summed to create a signal.

At an operation 704, the weight-change component 640 calculates a first mean value comprising a mean of a first set of weight measurements of the signal, while at an operation 706 the weight-change component 640 calculates a second mean value comprising a mean of a second set of weight measurements of the signal, the second set including the first set and at least one additional weight measurement of the signal. For example, the weight-change component 640 may generate the first mean value 422(1) associated with the first example window 420(1) and the second mean value 422(2) of the second example window 420(2). Of course, while two example means are discussed, it is to be appreciated that any other number of mean values for respective windows may be calculated. Further, in some instances each window begins with a most-recent weight measurement of the signal such that each window overlaps with one another.

At an operation 708, the weight-change component 640 calculates a third mean value comprising a mean of at least the first mean value and the second mean value. In some instances, this may comprise calculating a mean of the "n" number of mean values calculated for "n" number of windows. At an operation 710, the weight-change component 640 may store the third mean value as the current weight of the one or more objects. For example, the weight-change component 640 may store this value as weight data 682. This may be further used by the weight-change component 640 for comparing to a prior weight value (e.g., stored in the weight data 682) for determining whether a threshold weight change has occurred, which in turn may be used to determine an outcome of one or more events involving items placed into or removed from a basket of a cart, as described herein.

At an operation 712, the weight-change component 640 may determine that the first mean value is a largest mean value of the set of mean values from which the third mean value was calculated. It is to be appreciated that while the first mean value is described as being the largest mean value of the set, any other one of the mean values may be determined to be the largest value. At an operation 714, the weight-change component 640 determines that the second mean value is a smallest mean value of the set of mean values. Again, it is to be appreciated that while the second mean value is described as being the smallest mean value of the set, any other one of the mean values may be determined to be the smallest value.

At an operation 716, the weight-change component 640 calculates a difference between the first mean value and the second mean value, while at an operation 718 the weight-change component 640 determines whether this difference is less than a threshold value. If so, then at an operation 720 the weight-change component 640 stores an indication that the weight is stable. If not, then at an operation 722 weight-change component 640 stores an indication that the weight is not stable. In some instances, calculating a difference between the first mean value and the second mean value may comprise determining an absolute value of the difference between these mean values and comparing that to a threshold, while in other instances determining this difference may further include squaring the determined difference and comparing this squared value to a threshold. Of course, while a few examples are provided, other techniques may be used for determining whether the weight is to be marked as stable or not stable.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

Figure 8:
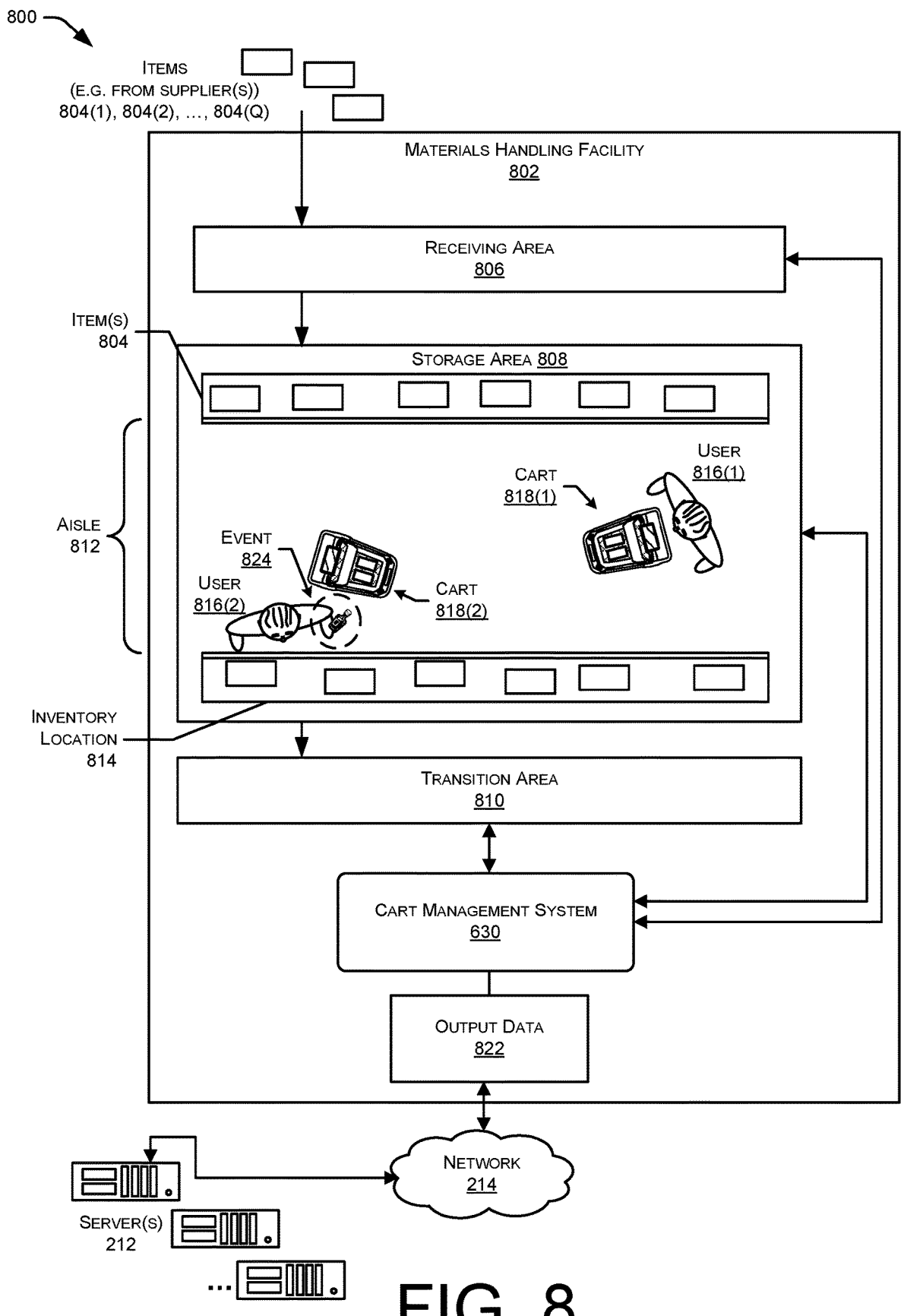
FIG. 8 is a block diagram of an example materials handling facility that includes item-identifying carts and a cart management system configured to generate output regarding events occurring in the cart using sensor data.

FIG. 8 is a block diagram 800 of an example materials handling facility 802 that includes item-identifying carts and a cart management system configured to generate output regarding events occurring in the cart using sensor data. However, the following description is merely one illustrative example of an industry and environment in which the techniques described herein may be utilized.

An implementation of a materials handling facility 802 (e.g., facility 200) configured to store and manage inventory items is illustrated in FIG. 8. A materials handling facility 802 (facility) comprises one or more physical structures or areas within which one or more items 804(1), 804(2), ..., 804(Q) (generally denoted as 804) may be held. As used in this disclosure, letters in parenthesis such as "(Q)" indicate an integer result. The items 804 comprise physical goods, such as books, pharmaceuticals, repair parts, electronic gear, groceries, and so forth.

The facility 802 may include one or more areas designated for different functions with regard to inventory handling. In this illustration, the facility 802 includes a receiving area 806, a storage area 808, and a transition area 810. The receiving area 806 may be configured to accept items 804, such as from suppliers, for intake into the facility 802. For example, the receiving area 806 may include a loading dock at which trucks or other freight conveyances unload the items 804.

The storage area 808 is configured to store the items 804. The storage area 808 may be arranged in various physical configurations. In one implementation, the storage area 808 may include one or more aisles 812. The aisles 812 may be configured with, or defined by, inventory locations 814 on one or both sides of the aisle 812. The inventory locations 814 may include one or more of shelves, racks, cases, cabinets, bins, floor locations, or other suitable storage mechanisms for holding or storing the items 804. The inventory locations 814 may be affixed to the floor or another portion of the facility's structure, or may be movable such that the arrangements of aisles 812 may be reconfigurable. In some implementations, the inventory locations 814 may be configured to move independently of an outside operator. For example, the inventory locations 814 may comprise a rack with a power source and a motor, operable by a computing device to allow the rack to move from one location within the facility 802 to another.

One or more users 816(1), 816(2), ..., 816(U), carts 818(1), 818(2), ..., 818(T) (generally denoted as 818) or other material handling apparatus may move within the facility 802. For example, the users 816 may move about within the facility 802 to pick or place the items 804 in various inventory locations 814, placing them on the carts 818 for ease of transport. An individual cart 818 is configured to carry or otherwise transport one or more items 804. For example, a cart 818 may include a basket, a cart, a bag, and so forth. In other implementations, other agencies such as robots, forklifts, cranes, aerial drones, and so forth, may move about the facility 802 picking, placing, or otherwise moving the items 804.

One or more sensors may be configured to acquire information in the facility 802. The sensors in the facility 802 may include sensors fixed in the environment (e.g., ceiling-mounted cameras) or otherwise, such as sensors in the possession of users (e.g., mobile phones, tablets, etc.) or sensors mounted on the carts 818. The sensors may include, but are not limited to, cameras, weight sensors (e.g., in the bottom of the carts 818), radio frequency (RF) receivers, temperature sensors, humidity sensors, vibration sensors, and so forth. The sensors may be, in some examples, in or on the cart 818 or another location in the facility 802. In one example, the bottom of a basket of the carts 818 may include weight sensors configured to determine a weight of the items 804 placed thereupon.

During operation of the facility 802, the sensors may be configured to provide information suitable for identifying the movement of items 804 or other occurrences within the cart 818. For example, a series of images acquired by a camera may indicate removal of an item 804 from a particular cart 818 by one of the users 816 and/or placement of the item 804 on or at least partially within one of the carts 818.

While the storage area 808 is depicted as having one or more aisles 812, inventory locations 814 storing the items 804, sensors, and so forth, it is understood that the receiving area 806, the transition area 810, or other areas of the facility 802 may be similarly equipped. Furthermore, the arrangement of the various areas within the facility 802 is depicted functionally rather than schematically. For example, multiple different receiving areas 806, storage areas 808, and transition areas 810 may be interspersed rather than segregated in the facility 802.

The carts 818 may include, or be coupled to, a cart management system 630 (e.g., cart management system 630). The cart management system 630 is configured to identify interactions with and between users 816 and carts 818, in one or more of the receiving area 806, the storage area 808, or the transition area 810. These interactions may include one or more events 824. For example, events 824 may include placing of an item 804 in a cart 818, returning of an item 804 from the cart 818 to an inventory location 814, and so forth. Other events 824 involving users 816 may include the user 816 providing authentication information in the facility 802, using a computing device at the facility 802 to authenticate identity to the cart management system 630, and so forth.

By determining the occurrence of one or more of the events 824, the cart management system 630 may generate output data 822. The output data 822 comprises information about the event 824 and, thus, in some instances may correspond to the event-description 660. For example, where the event 824 comprises an item 804 being removed from, or placed in, a cart 818, the output data 822 may comprise an item identifier indicative of the particular item 804 that was removed from, or placed in, the cart 818, a quantity of the item 804, a user identifier associated with a user that removed the item 804, and/or other output data 822.

The cart management system 630 may use one or more automated systems to generate the output data 822. For example, an artificial neural network, one or more classifiers, or other automated machine learning techniques may be used to process the sensor data and/or image data from the one or more sensors to generate output data 822. The automated systems may operate using probabilistic or non-probabilistic techniques. For example, the automated systems may use a Bayesian network. In another example, the automated systems may use support vector machines to generate the output data 822 or the tentative results. The automated systems may generate confidence level data that provides information indicative of the accuracy or confidence that the output data 822 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 135%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 804 may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 816 may pick an item 804(1) such as a perfume bottle that is generally cubical in shape from the inventory location 814. Other items 804 at nearby inventory locations 814 may be predominately spherical. Based on the difference in shape (cube vs. sphere) from the adjacent items, and the correspondence in shape with the previously stored image of the perfume bottle item 804(1) (cubical and cubical), the confidence level that the user 202 has picked up the perfume bottle item 804(1) is high.

In some situations, the automated techniques may be unable to generate output data 822 with a confidence level above a threshold result. For example, the automated techniques may be unable to distinguish which item 804 in large a group of items a user 816 has picked up from the inventory location 814 and placed in the cart 818. In other situations, it may be desirable to provide human confirmation of the event 824 or of the accuracy of the output data 822. For example, some items 804 may be deemed age restricted such that they are to be handled only by users 816 above a minimum age threshold.

In instances where human confirmation is desired, sensor data associated with an event 824 may be processed to generate inquiry data. The inquiry data may include a subset of the sensor data associated with the event 824. The inquiry data may also include one or more of one or more tentative results as determined by the automated techniques, or supplemental data. The subset of the sensor data may be determined using information about the one or more sensors. The subset of the sensor data may include images that may show the item 804 being placed in, or removed from, the cart 818. The subset of the sensor data may also omit images from other cameras that did not have that item 804 in the field of view. The field of view may comprise a portion of the scene in the cart 818 that the camera is able to generate sensor/image data about.

Continuing the example, the subset of the sensor data may comprise a video clip acquired by one or more cameras having a field of view that includes the item 804. The tentative results may comprise the "best guess" as to which items 804 may have been involved in the event 824. For example, the tentative results may comprise results determined by the automated system that have a confidence level above a minimum threshold.

The facility 802 may be configured to receive different kinds of items 804 from various suppliers and to store them until a customer orders or retrieves one or more of the items 804. A general flow of items 804 through the facility 802 is indicated by the arrows of FIG. 8. Specifically, as illustrated in this example, items 804 may be received from one or more suppliers, such as manufacturers, distributors, wholesalers, and so forth, at the receiving area 806. In various implementations, the items 804 may include merchandise, commodities, perishables, or any suitable type of item 804, depending on the nature of the enterprise that operates the facility 802. The receiving of the items 804 may comprise one or more events 824 for which the cart management system 630 may generate output data 822.

Upon being received from a supplier at receiving area 806, the items 804 may be prepared for storage. For example, items 804 may be unpacked or otherwise rearranged. An inventory management system of the facility 802 may include one or more software applications executing on a computer system to provide inventory management functions based on the events 824 associated with the unpacking or rearrangement. These inventory management functions may include maintaining information indicative of the type, quantity, condition, cost, location, weight, or any other suitable parameters with respect to the items 804. The items 804 may be stocked, managed, or dispensed in terms of countable, individual units or multiples, such as packages, cartons, crates, pallets, or other suitable aggregations. Alternatively, some items 804, such as bulk products, commodities, and so forth, may be stored in continuous or arbitrarily divisible amounts that may not be inherently organized into countable units. Such items 804 may be managed in terms of measurable quantity such as units of length, area, volume, weight, time, duration, or other dimensional properties characterized by units of measurement. Generally speaking, a quantity of an item 804 may refer to either a countable number of individual or aggregate units of an item 804 or a measurable amount of an item 804, as appropriate.

After arriving through the receiving area 806, items 804 may be stored within the storage area 808. In some implementations, like items 804 may be stored or displayed together in the inventory locations 814 such as in bins, on shelves, hanging from pegboards, and so forth. In this implementation, all items 804 of a given kind are stored in one inventory location 814. In other implementations, like items 804 may be stored in different inventory locations 814. For example, to optimize retrieval of certain items 804 having frequent turnover within a large physical facility 802, those items 804 may be stored in several different inventory locations 814 to reduce congestion that might occur at a single inventory location 814.

When a customer order specifying one or more items 804 is received, or as a user 816 progresses through the facility 802, the corresponding items 804 may be selected or "picked" from the inventory locations 814 containing those items 804. In various implementations, item picking may range from manual to completely automated picking. For example, in one implementation, a user 816 may have a list of items 804 they desire and may progress through the facility 802 picking items 804 from inventory locations 814 within the storage area 808 and placing those items 804 into a cart 818. In other implementations, employees of the facility 802 may pick items 804 using written or electronic pick lists derived from customer orders. These picked items 804 may be placed into the cart 818 as the employee progresses through the facility 802. Picking may comprise one or more events 824, such as the user 816 in moving to the inventory location 814, retrieval of the item 804 from the inventory location 814, and so forth.

After items 804 have been picked, they may be processed at a transition area 810. The transition area 810 may be any designated area within the facility 802 where items 804 are transitioned from one location to another or from one entity to another. For example, the transition area 810 may be a packing station within the facility 802. When the item 804 arrives at the transition area 810, the items 804 may be transitioned from the storage area 808 to the packing station. Information about the transition may be maintained by the cart management system 630 using the output data 822 associated with those events 824.

In another example, if the items 804 are departing the facility 802 a list of the items 804 may be used by the cart management system 630 to transition responsibility for, or custody of, the items 804 from the facility 802 to another entity. For example, a carrier may accept the items 804 for transport with that carrier accepting responsibility for the items 804 indicated in the list. In another example, a customer may purchase or rent the items 804 and remove the items 804 from the facility 802.

The cart management system 630 may access or generate sensor data about the items 804, the users 816, the carts 818, and so forth. The sensor data may be acquired by one or more of the sensors, data provided by other systems, and so forth. For example, the sensors may include cameras configured to acquire image data of items 804 placed in the carts 818. The image data may comprise still images, video, or a combination thereof. The image data may be processed by the cart management system 630 to determine an item identifier for the items 804, a listing of items in the cart 818 for a user 816, and so forth.

The inventory management system 1122, or systems coupled thereto, may be configured to determine an account identifier corresponding to the user 1116 to distinguish the user 1116 from other users located in the environment based on these respective account identifiers. In some cases, for example, the inventory management system 122 may detect that a person is entering the facility and may assign a unique identifier to that person such that the identifier is located within the facility. Or, this unique identifier may be assigned to the user upon the user logging in using the display on the cart or the like. This identifier may be associated to that person based on information provided by the person in some instances. Again, it is to be appreciated that this identifier may be generic and free from information outwardly identifying the person, and that this identifier may be located within the facility rather than information identifying the person.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A mobile cart comprising:
a frame that defines a basket;
a display;
one or more cameras coupled to the frame and configured to generate image data;
one or more weight sensors coupled to the frame;
one or more processors; and
one or more computer-readable media storing computer-executable instructions that, when executed, cause the one or more processors to perform acts comprising:
receiving the image data generated by the one or more cameras;
receiving at least one signal from the one or more weight sensors, the at least one signal comprising individual weight measurements of the basket over time;
determining a first mean value comprising a mean of a first set of weight measurements of the signal;
determining a second mean value comprising a mean of a second set of weight measurements of the signal, the second set including the first set and at least one additional weight measurement of the signal;
determining a third mean value comprising a mean of at least the first mean value and the second mean value;
storing the third mean value as a current weight of the basket;
determining, based at least in part on the first mean value and the second mean value, that the current weight of the basket meets one or more stability criteria;
storing a first indication that the current weight of the basket meets the one or more stability criteria;
at least partly in response to storing the first indication, determining, based at least in part on the image data and the current weight of the basket, and that an item has been placed into the basket; and
presenting, on the display, a second indication that the item has been placed into the basket.

2. The mobile cart of claim 1, wherein the one or more computer-readable media further store computer-executable instructions that, when executed, cause the one or more processors to perform acts comprising:
calculating a difference between the first mean value and the second mean value;
determining that the difference is less than a threshold;
and wherein the determining that the current weight of the basket meets the one or more stability criteria comprises determining that the difference is less than the threshold.

3. The mobile cart of claim 1, wherein:
the first set of weight measurements corresponds to a first window of the signal between a most recent weight measurement of the signal and one or more weight measurements prior to the most recent weight measurement; and
the second set of weight measurements corresponds to a second window of the signal between the most recent weight measurement and at least one weight measurement prior to a least recent weight measurement of the first window.

4. The mobile cart of claim 1, wherein the one or more computer-readable media further store computer-executable instructions that, when executed, cause the one or more processors to perform acts comprising:
calculating a first cumulative sum corresponding to a sum of each weight measurement of the first set of weight measurements, the first set of weight measurements corresponding to a first number of weight measurements;
calculating a second cumulative sum corresponding to a sum of each weight measurement of the second set of weight measurements, the second set of weight measurements corresponding to a second number of weight measurements; and
wherein:
the determining the second mean value comprises dividing the second cumulative sum by the second number; and
the determining the first mean value comprises subtracting the first cumulative sum from the second cumulative sum to determine a difference and dividing the difference by the first number.

5. A method for determining a current weight of one or more items in a basket of a mobile cart, the method comprising:
generating, using one or more cameras of a mobile cart, image data representing an item being placed into the basket;
generating, using one or more weight sensors of the mobile cart, a signal indicating weight measurements over time;
calculating a first mean value comprising a mean of a first set of weight measurements of the signal;
calculating a second mean value comprising a mean of a second set of weight measurements of the signal, the second set including the first set and at least one additional weight measurement of the signal;
calculating a third mean value comprising a mean of at least the first mean value and the second mean value;
storing the third mean value as the current weight of the one or more items in the basket;
determining, based at least in part on the image data and the current weight, that the item has been placed into the basket; and
presenting, on a display of the mobile cart, an indication that the item has been placed into the basket.

6. The method as recited in claim 5, further comprising:
determining, based at least in part on the first mean value and the second mean value, that the current weight meets one or more stability criteria; and
storing an indication that the current weight meets the one or more stability criteria.

7. The method as recited in claim 6, further comprising:
calculating a difference between the first mean value and the second mean value;
determining that the difference is less than a threshold;
and wherein the determining that the current weight meets the one or more stability criteria comprises determining that the difference is less than the threshold.

8. The method as recited in claim 6, wherein the calculating the third mean value comprises calculating the third mean value as a mean of a set of mean values, the set of mean values including the first mean value and the second mean value, and further comprising:
analyzing the set of mean values to determine that the first mean value is a largest mean value of the set of mean values;
analyzing the set of mean values to determine that the second mean value is a smallest mean value of the set of mean values;
calculating a difference between the first mean value and the second mean value;
determining that the difference is less than a threshold;
and wherein the determining that the current weight meets the one or more stability criteria comprises determining that the difference is less than the threshold.

9. The method as recited in claim 5, wherein:
the first set of weight measurements corresponds to a first window of the signal between a most recent weight measurement of the signal and one or more weight measurements prior to the most recent weight measurement; and
the second set of weight measurements corresponds to a second window of the signal between the most recent weight measurement and at least one weight measurement prior to a least recent weight measurement of the first window.

10. The method as recited in claim 5, further comprising:
calculating, prior to calculating the third mean value, a fourth mean value comprising a mean of a third set of weight measurements of the signal, the third set including the second set and at least one additional weight measurement of the signal;
and wherein the calculating the third mean value comprises calculating a mean of at least the first mean value, the second mean value, and the fourth mean value.

11. The method as recited in claim 5, further comprising:
calculating a first cumulative sum corresponding to a sum of each weight measurement of the first set of weight measurements, the first set of weight measurements corresponding to a first number of weight measurements;
calculating a second cumulative sum corresponding to a sum of each weight measurement of the second set of weight measurements, the second set of weight measurements corresponding to a second number of weight measurements; and
wherein:
the calculating the second mean value comprises dividing the second cumulative sum by the second number; and
the calculating the first mean value comprises subtracting the first cumulative sum from the second cumulative sum to determine a difference and dividing the difference by the first number.

12. A system comprising:
a frame that defines a basket;
a display;
one or more cameras;
one or more weight sensors;
one or more processors; and one or more computer-readable media storing computer-executable instructions that, when executed, cause the one or more processors to perform acts comprising:
  generating image data using the one or more cameras;
  generating, using the one or more weight sensors, a signal indicating weight measurements over time;
  calculating a first mean value comprising a mean of a first set of weight measurements of the signal;
  calculating a second mean value comprising a mean of a second set of weight measurements of the signal, the second set including the first set and at least one additional weight measurement of the signal;
  calculating a third mean value comprising a mean of at least the first mean value and the second mean value;
  storing the third mean value as a current weight of one or more in the basket;
  determining, based at least in part on the image data and the current weight, that an item has been placed into the basket; and
  presenting, on the display, an indication that the item has been placed into the basket.

13. The system as recited in claim 12, wherein the one or more computer-readable media further store computer-executable instructions that, when executed, cause the one or more processors to perform acts comprising:
  determining, based at least in part on the first mean value and the second mean value, that the current weight meets one or more stability criteria; and
  storing an indication that the current weight meets the one or more stability criteria.

14. The system as recited in claim 13, wherein the one or more computer-readable media further store computer-executable instructions that, when executed, cause the one or more processors to perform acts comprising:
  calculating a difference between the first mean value and the second mean value;
  determining that the difference is less than a threshold;
  and wherein the determining that the current weight meets the one or more stability criteria comprises determining that the difference is less than the threshold.

15. The system as recited in claim 13, wherein the calculating the third mean value comprises calculating the third mean value as a mean of a set of mean values, the set of mean values including the first mean value and the second mean value, and the one or more computer-readable media further store computer-executable instructions that, when executed, cause the one or more processors to perform acts comprising:
  analyzing the set of mean values to determine that the first mean value is a largest mean value of the set of mean values;
  analyzing the set of mean values to determine that the second mean value is a smallest mean value of the set of mean values;
  calculating a difference between the first mean value and the second mean value;
  determining that the difference is less than a threshold;
  and wherein the determining that the current weight meets the one or more stability criteria comprises determining that the difference is less than the threshold.

16. The system as recited in claim 12, wherein:
  the first set of weight measurements corresponds to a first window of the signal between a most recent weight measurement of the signal and one or more weight measurements prior to the most recent weight measurement; and
  the second set of weight measurements corresponds to a second window of the signal between the most recent weight measurement and at least one weight measurement prior to a least recent weight measurement of the first window.

17. The system as recited in claim 12, wherein the one or more computer-readable media further store computer-executable instructions that, when executed, cause the one or more processors to perform acts comprising:
  calculating, prior to calculating the third mean value, a fourth mean value comprising a mean of a third set of weight measurements of the signal, the third set including the second set and at least one additional weight measurement of the signal;
  and wherein the calculating the third mean value comprises calculating a mean of at least the first mean value, the second mean value, and the fourth mean value.

18. The system as recited in claim 12, wherein the one or more computer-readable media further store computer-executable instructions that, when executed, cause the one or more processors to perform acts comprising:
  calculating a first cumulative sum corresponding to a sum of each weight measurement of the first set of weight measurements, the first set of weight measurements corresponding to a first number of weight measurements;
  calculating a second cumulative sum corresponding to a sum of each weight measurement of the second set of weight measurements, the second set of weight measurements corresponding to a second number of weight measurements; and
  wherein:
    the calculating the second mean value comprises dividing the second cumulative sum by the second number; and
    the calculating the first mean value comprises subtracting the first cumulative sum from the second cumulative sum to determine a difference and dividing the difference by the first number.

19. A method for determining a current weight of one or more items in a basket of a mobile cart, the method comprising:
  generating, using one or more weight sensors of the mobile cart, a signal indicating weight measurements over time;
  calculating a first mean value comprising a mean of a first set of weight measurements of the signal;
  calculating a second mean value comprising a mean of a second set of weight measurements of the signal, the second set including the first set and at least one additional weight measurement of the signal;
  calculating a third mean value comprising a mean of at least the first mean value and the second mean value;
  storing the third mean value as a current weight of the one or more items in the basket;
  determining, based at least in part on the current weight, that the item has been placed into the basket; and
  presenting, on a display of the mobile cart, an indication that the item has been placed into the basket.

* * * * *